(12) United States Patent
Burky

(10) Patent No.: US 10,977,038 B2
(45) Date of Patent: Apr. 13, 2021

(54) CHECKPOINTING SPECULATIVE REGISTER MAPPINGS

(71) Applicant: Arm Limited, Cambridge (GB)

(72) Inventor: William Elton Burky, Austin, TX (US)

(73) Assignee: Arm Limited, Cambridge (GB)

( * ) Notice: Subject to any disclaimer, the term of this patent is extended or adjusted under 35 U.S.C. 154(b) by 1 day.

(21) Appl. No.: 16/445,641

(22) Filed: Jun. 19, 2019

(65) Prior Publication Data

US 2020/0401408 A1 Dec. 24, 2020

(51) Int. Cl.
*G06F 9/30* (2018.01)
*G06F 9/38* (2018.01)

(52) U.S. Cl.
CPC ........ *G06F 9/30141* (2013.01); *G06F 9/3842* (2013.01)

(58) Field of Classification Search
None
See application file for complete search history.

(56) References Cited

U.S. PATENT DOCUMENTS

| 5,675,759 | A | 10/1997 | Shebanow | |
|---|---|---|---|---|
| 5,961,636 | A | 10/1999 | Brooks | |
| 7,069,411 | B1 * | 6/2006 | McMinn | G06F 9/3836 711/202 |
| 8,918,625 | B1 * | 12/2014 | O'Bleness | G06F 9/30043 712/216 |
| 2005/0120191 | A1 * | 6/2005 | Akkary | G06F 9/3836 712/217 |
| 2006/0161740 | A1 * | 7/2006 | Kottapalli | G06F 9/3834 711/152 |
| 2008/0148026 | A1 * | 6/2008 | Dhodapkar | G06F 9/3844 712/228 |
| 2010/0031084 | A1 * | 2/2010 | Tremblay | G06F 9/3005 714/13 |
| 2011/0238962 | A1 * | 9/2011 | Cain, III | G06F 9/384 712/228 |

(Continued)

OTHER PUBLICATIONS

U.S. Appl. No. 16/124,247, filed Sep. 7, 2018, Burky et al.
(Continued)

*Primary Examiner* — Michael Sun
(74) *Attorney, Agent, or Firm* — Nixon & Vanderhye P.C.

(57) ABSTRACT

A processing apparatus supporting register renaming is provided with checkpoint circuitry to capture register mapping checkpoints indicative of speculative register mappings between logical registers and physical registers at a given point of speculative execution, and register group tracking circuitry to maintain tracking information for groups of logical registers. The tracking information for a given group indicates whether the given group is a changed group comprising at least one logical register for which a corresponding speculative register mapping has changed since a last checkpoint was captured, or an unchanged group for which none of the logical registers in that group have had their speculative register mappings changed since the last checkpoint was captured. When capturing a new register mapping checkpoint, unchanged groups of logical registers are excluded from the new register mapping checkpoint. This can save power in a register mapping checkpointing scheme.

15 Claims, 13 Drawing Sheets

(56) References Cited

U.S. PATENT DOCUMENTS

2011/0264862 A1* 10/2011 Karlsson ............... G06F 9/3842
                                                           711/125
2014/0025928 A1*  1/2014 Bradbury ............ G06F 9/30185
                                                           712/204
2014/0281427 A1   9/2014 Abdallah
2017/0185410 A1*  6/2017 Abernathy ............. G06F 9/384
2018/0300150 A1* 10/2018 Gschwind ........... G06F 9/30043

OTHER PUBLICATIONS

Office Action dated Feb. 20, 2020 in co-pending U.S. Appl. No. 16/124,247 20 pages.
D. Carmean, "The Intel Pentium 4 Processor" Spring 2002, 39 pages.
Final Office Action dated Jul. 2, 2020 for co-pending U.S. Appl. No. 16/124,247 28 pages.

* cited by examiner misprediction detected for uop H apply further update to SRT:

(flush younger ROB / RCQ entries)

Checkpoint state info.

|  | V | UID | RCQ Pointer | Youngest Mask | G0 | G1 | G2 | G3 |
|---|---|---|---|---|---|---|---|---|
| CP0 | 0 |  |  |  |  |  |  |  |
| CP1 | 0 |  |  |  |  |  |  |  |
| CP2 | 1 | G | Px | 0001 | 1 | 0 | 0 | 1 |
| CP3 | 0 | — | — | — | — | — | — | — |

CP3 flushed

96

CHECKPOINTING SPECULATIVE REGISTER MAPPINGS

BACKGROUND

Technical Field

The present technique relates to the field of data processing.

Technical Background

A data processing apparatus may have register renaming circuitry for mapping logical registers specified by micro-operations to be processed to physical registers provided in hardware.

SUMMARY

At least some examples provide an apparatus comprising:
processing circuitry to perform data processing in response to micro-operations;
register renaming circuitry to map logical registers specified by the micro-operations to physical registers provided in hardware;
checkpoint circuitry to capture register mapping checkpoints, each register mapping checkpoint indicative of speculative register mappings between logical registers and physical registers at a given point of speculative execution; and
register group tracking circuitry to maintain tracking information for a plurality of groups of logical registers, each group comprising one or more logical registers, the tracking information for a given group indicating whether the given group is a changed group comprising at least one logical register for which a corresponding speculative register mapping has changed since a last register mapping checkpoint was captured, or an unchanged group for which none of the logical registers in that group have had their speculative register mappings changed since the last register mapping checkpoint was captured; in which:
when capturing a new register mapping checkpoint, the checkpoint circuitry is configured to exclude from the new register mapping checkpoint the speculative register mappings for logical registers in an unchanged group of logical registers.

At least some examples provide an apparatus comprising:
means for performing data processing in response to micro-operations;
means for mapping logical registers specified by the micro-operations to physical registers provided in hardware;
means for capturing register mapping checkpoints, each register mapping checkpoint indicative of speculative register mappings between logical registers and physical registers at a given point of speculative execution; and
means for maintaining tracking information for a plurality of groups of logical registers, each group comprising one or more logical registers, the tracking information for a given group indicating whether the given group is a changed group comprising at least one logical register for which a corresponding speculative register mapping has changed since a last register mapping checkpoint was captured, or an unchanged group for which none of the logical registers in that group have had their speculative register mappings changed since the last register mapping checkpoint was captured; in which:
when capturing a new register mapping checkpoint, the means for capturing is configured to exclude from the new register mapping checkpoint the speculative register mappings for logical registers in an unchanged group of logical registers.

At least some examples provide a data processing method comprising:
performing data processing in response to micro-operations;
mapping logical registers specified by the micro-operations to physical registers provided in hardware;
capturing register mapping checkpoints, each register mapping checkpoint indicative of speculative register mappings between logical registers and physical registers at a given point of speculative execution; and
maintaining tracking information for a plurality of groups of logical registers, each group comprising one or more logical registers, the tracking information for a given group indicating whether the given group is a changed group comprising at least one logical register for which a corresponding speculative register mapping has changed since a last register mapping checkpoint was captured, or an unchanged group for which none of the logical registers in that group have had their speculative register mappings changed since the last register mapping checkpoint was captured; in which:
when a new register mapping checkpoint is captured, speculative register mappings for logical registers in an unchanged group of logical registers are excluded from the new register mapping checkpoint.

Further aspects, features and advantages of the present technique will be apparent from the following description of examples, which is to be read in conjunction with the accompanying drawings.

DESCRIPTION OF EXAMPLES

Figure 1:
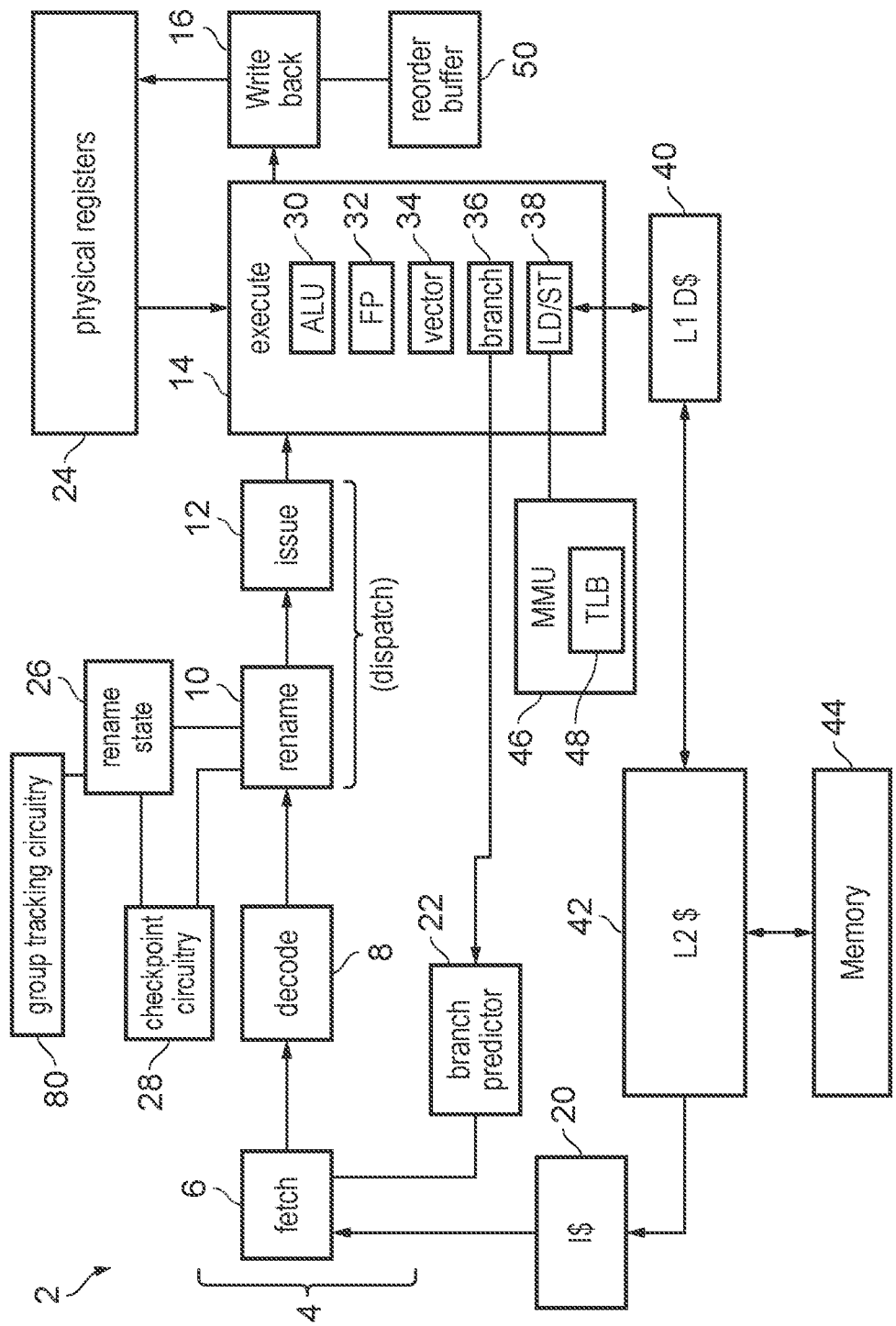
FIG. 1 schematically illustrates an example of a data processing apparatus.

An apparatus may have processing circuitry to perform data processing in response to micro-operations, and register renaming circuitry to map logical registers specified by the micro-operations to physical registers provided in the hardware. The micro-operations are the instructions to be processed in the form seen by the register renaming circuitry. In some systems, program instructions fetched from a cache or memory may be decoded into micro-operations in a one-to-one relationship so that the micro-operations may in some cases simply be the original program instructions which were fetched. In other systems, an instruction decoder may be able to decode a single program instruction into multiple micro-operations which are then handled separately by subsequent parts of a processing pipeline, and so in this case each micro-operation could correspond to an individual part of the functionality of the program instruction fetched from the memory. In some systems, it may also be possible to merge multiple program instructions into a combined micro-operation which is then processed as a single entity in later stages of the pipeline. Hence, the present technique is not particularly limited as to how the micro-operations are generated, but in general the processing circuitry receives a number of micro-operations which represent particular data processing operations to be performed.

The micro-operations may specify logical registers, which are selected from a certain number of logical registers as defined in the instruction set architecture supported by the apparatus. However, the apparatus may actually have a larger number of physical registers. The register renaming circuitry is responsible for mapping the logical registers specified by the micro-operations to be processed into physical registers provided in hardware. Without support for register renaming, two micro-operations which write to the same logical register would have to be executed in program order, to ensure subsequent instructions use the correct value for the logical register. However, by using register renaming to map the same logical register to different physical registers for the two micro-operations, this can enable micro-operations to be executed in parallel or out of order, which can help to improve performance.

The processing circuitry may support speculative processing of micro-operations, where micro-operations may be executed before it is known whether or not the micro-operation should really have been executed and/or before it is known whether any input operands for the micro-operation are correct. For example, speculation could be based on a branch prediction, a load value prediction, or other predictions about the expected execution behaviour. By making predictions about program behaviour before the actual outcome is known, this can improve performance when the prediction is correct because this eliminates at least some of the delay in waiting for the actual outcome to be available, allowing subsequent instructions to be fetched and decoded earlier. However, sometimes the predictions may be incorrect and at this point the register renaming circuitry may have updated its register mappings incorrectly based on one or more mispredicted micro-operations. At this point, it may be necessary to flush the mispredicted micro-operations and restore processor state to the point before the misprediction occurred. Also, previous register mappings may be restored at the register renaming circuitry, so that the mappings between logical registers and physical registers are reset to the mappings that were present when the mispredicted micro-operation was encountered.

One approach for handling this restoration of previous register mappings can be to maintain an architectural rename table and a speculative rename table, where the speculative rename table is updated based on speculatively processed micro-operations but the architectural rename table is updated once the corresponding micro-operations have been committed (when it is known that they were correctly executed). This means that if a misprediction occurs, then the previous register mappings can be restored by copying the architectural rename table's contents to the speculative rename table. However, as the commit point of execution (representing the last committed micro-operation whose outcome is known to be correct) may lag the misprediction point (representing the part of the program flow corresponding to the micro-operation that was mispredicted), then simply restoring the architectural rename table state to the speculative rename table may either need a significant number of micro-operations to be re-executed corresponding to those micro-operations between the commit point and the mispredict point, or if tracking state is maintained to track the updates to the logical-to-physical register mappings that were made by those intervening micro-operations, then this may require a significant number of updates to the newly restored speculative rename table in order to take into account subsequent changes which happened up to the mispredict point. Either way, this can slow down the handling of a misprediction.

A technique for speeding up the misprediction processing can be to provide checkpoint circuitry for capturing register mapping checkpoints where each register mapping checkpoint is indicative of speculative register remappings between logical registers and physical registers at a given point of speculative execution. Hence, whereas the architectural rename table may track non-speculative register mappings between logical and physical registers at the commit point, each checkpoint represents a snapshot of speculative register mappings at a subsequent point of execution that is still speculative and may not be correct. By capturing additional checkpoints of speculative register mappings, this means that if a misprediction occurs then it may not be necessary to rewind the register mapping state all the way back to the commit point, as one of the more recently captured checkpoints can be used instead for the restoration of the speculative register mappings in the speculative rename table. This can improve performance.

However, in practice, capturing such register mapping checkpoints can consume a relatively significant amount of power, because checkpoints may need to be captured often enough that there is a likelihood than on a misprediction there is a sufficiently recent log of speculative register mappings so that the amount of rebuilding of the register mappings that were active at the mispredict point can be reduced. Also, capturing each checkpoint may require a relatively large amount of state data to be stored, as for each logical register supported by the instruction set architecture, a sufficient number of bits able to represent every possible or physical register will need to be captured. For example, if an architecture supports 32 logical registers and the renaming for a given micro-architectural implementation uses 128 physical registers (representable in 7 bits), then this would correspond to at least 224 bits of checkpoint states per checkpoint. Clocking 224 flip-flops each time a register mapping checkpoint is captured can consume a lot of power.

In the techniques discussed below, register group tracking circuitry is provided to maintain tracking information for a number of groups of logical registers, where each group comprises one or more logical registers. The tracking information for a given group indicates whether the given group is a changed group which comprises at least one logical register for which a corresponding speculative register mapping has changed since a last register mapping checkpoint was captured, or an unchanged group for which none of the local registers in that group have had their speculative register mappings changed since the last register mapping checkpoint was captured. If any one of the logical registers in a given group has its speculative register mapping changed since the last register mapping checkpoint was captured, then this is enough for that group to become a changed group even if other logical registers in the same group have not had their speculative register mappings changed.

When capturing a new register mapping checkpoint, the checkpoint circuitry can check the tracking information recorded by the register group tracking circuitry, and exclude from the new register mapping checkpoint the speculative register mappings for logical registers in an unchanged group of logical registers. Hence, by recording on a group-by-group basis which logical registers have had their mappings changed and omitting from new register mapping checkpoints unchanged groups of logical registers, this can reduce the number of storage elements which have to be updated when capturing a new register mapping checkpoint, to save power.

This approach may be seen as counter-intuitive, as one may think that the likelihood of a given group of registers remaining unchanged since the last checkpoint may be relatively low, as one might expect that the limited number of logical registers means that register pressure will force programmers or compilers to use the available logical registers fairly evenly, trying to use each different logical register before having to reuse a logical register, to reduce the likelihood of hazards. Therefore, one may think that the group based tracking scheme discussed above may in practice not lead to a significant reduction in the amount of checkpoint states stored. However, the inventor recognised that sometimes program code may include relatively tight program loops, where each iteration of the loop may have a relatively small number of instructions, and in this case a given section of program execution may concentrate its destination register references into a particular subset of the logical register space, with larger portions of the logical register space remaining unused for a period of time. Hence, for such sequences it may be more common that certain groups of logical registers do not have their speculative register mappings changed during a sequence of micro-operations, so that there is opportunity to save power by suppressing updates of checkpoints state for the unchanged groups of logical registers.

For example, when capturing a new register mapping checkpoint, the checkpoint circuitry may suppress clocking of a subset of checkpoint storage elements which would otherwise store the checkpointed speculative register mappings for the unchanged group of logical registers. This reduces dynamic power consumption.

Although it is possible to implement the register group tracking whereby at least one of the groups may only comprise a single logical register, it may be more efficient if each group comprises two or more logical registers. In practice, there may be a trade-off between the reduction in power consumption that can be achieved by omitting capture of checkpoint mappings for unchanged routes of logical registers, and the overhead associated with the register group tracking as they are updated when speculative register mapping has changed and the corresponding control overhead of checking the register group tracking information on saving and restoring checkpoints. In practice, reducing the accuracy of the register group track information so that a number of tracking flags are maintained, each corresponding to a group of two or more logical registers, can be enough to make a significant reduction in power when capturing checkpoints while not requiring too much additional control logic. For example, the logical registers could be divided into two, four or eight groups for example, with each group having an equal number of logical registers and having a corresponding tracking state flag which indicates whether that group is a changed group or an unchanged group. On capturing a new checkpoint then for each group the corresponding set of logical-to-physical register mappings are captured in the checkpoint if the tracking state flag indicates that the group is a changed group.

When a new register mapping checkpoint is captured, checkpoint state information may be stored in association with the new register mapping checkpoints, to indicate which groups of logical registers have their speculative register remappings included in the new register mapping checkpoint. This checkpoint state information can then be used on restoring speculative register mappings to determine which portions of the logical registers should have their mappings restored from a given checkpoint.

On capturing the new register mapping checkpoint, the register group tracking circuitry may reset the tracking information to indicate that all groups of logical registers are now unchanged groups of logical registers, since any previously changed register mappings would now be captured within the most recently captured checkpoint. By clearing the tracking information this means that the next time a register mapping checkpoint is captured then any mappings already recorded in the previous checkpoint will not be included in the latest register mapping checkpoint.

As discussed above, a speculative rename table may be provided to record current speculative register mappings between logical registers and physical registers. When a misprediction is detected for a mispredict point of execution, the checkpoint circuitry may restore, to the speculative rename table, speculative register mappings selected from at least one pre-misprediction register mapping checkpoint corresponding to an older point of execution than the mispredict point. While the selected checkpoint is older than the mispredict point, it may nevertheless be younger than the commit point representing the last known correct point of execution and so this means that there is less need for subsequent adjustments to the speculative rename table to bring it up to date to the mispredict point than if the restoration had been based on non-speculative mappings from an architectural rename table.

As each checkpoint may represent only a partial snapshot of the current speculative register mappings of the logical register numbers, then when restoring mappings in response to a misprediction, the checkpoint circuitry may be capable of combining speculative register mappings from two or more different register mapping checkpoints, to restore the speculative register mappings which were active at the mispredict point. For example if the most recent pre-misprediction register mapping checkpoint did not include the speculative register mappings for a particular register group, then the speculative register mappings for that register group may be restored from an earlier captured register mapping checkpoint instead of the youngest pre-misprediction register mapping checkpoint.

Hence, in response to a misprediction, the checkpoint circuitry may determine, separately for each group of logical registers, which of the register mapping checkpoints is the youngest pre-misprediction register mapping checkpoint which includes speculative register mappings for that group of logical registers and corresponds to an older point of execution and the mispredict point. For each group of logical registers the checkpoint circuitry may restore to the speculative rename table the speculative register mappings specified for that group of logical registers by the youngest pre-misprediction register mapping checkpoint determined for that group of logical registers. Hence, while power is saved on capturing checkpoints, there may be some additional logic overhead in determining on a group-by-group basis which checkpoint to use for the restoration. However, the additional overhead of the group by group checking of which checkpoint is the youngest pre-misprediction register mapping checkpoint that includes mappings for that group may be much less than the power cost of updating unchanged register mappings each time the checkpoint is captured, and so overall power can greatly be reduced by using the group tracking scheme discussed above where speculative register mappings for unchanged groups of logical registers are excluded from the latest checkpoint.

On the other hand, if for a given group of logical registers the checkpoint circuitry identifies that none of the register mapping checkpoints which correspond to an older point of execution than the mispredict point include speculative register mappings for a given group of logical registers, then in response to the misprediction the restoration of the register mappings to the speculative rename table for that given group of logical registers may be based on non-speculative register mappings specified by the architectural rename table. Hence, if there are certain groups of logical registers whose register mappings have not changed at all since the commit point then the non-speculative register mappings tracked in the architectural rename table would be used instead of any checkpointed speculative mappings.

Having restored register mappings to the speculative rename table, either based on a checkpoint or based on the architectural rename table, then some further updates of speculative register mappings may be made to bring the register mappings in line with the speculative register mappings which were active at the mispredict point. One way of doing this could be re-execute the micro-operations between the restore point of execution which corresponds to the restored checkpoint (or the youngest of the stored checkpoints if the restoration is based on the combination of two or more checkpoints) and the mispredict point. However, this may consume unnecessary power by re-executing correctly executed instructions.

Therefore, another approach can be to maintain a register commit queue which records a sequence of updates to speculative register mappings. Hence each time a micro-operation is renamed the corresponding mapping (or mappings) between a logical register and a physical register can be allocated to the register commit queue. Following restoration of speculative register mappings to the speculative rename table based on speculative register mappings corresponding to a restore point of execution earlier than the mispredict point of execution, the checkpoint circuitry may apply further updates to the speculative rename table based on one or more speculative register mappings recorded in the register commit queue which correspond to points of execution between the restore point of execution and the mispredict point of execution. By using the checkpoints as discussed above, the number of updates based on the register commit queue can be reduced, which speeds up misprediction handling compared to a restoration based on the architectural rename table When a misprediction is detected for a mispredict point of execution, some previously captured register mapping checkpoints may correspond to a younger point of execution than the mispredict point. Such post-misprediction register mapping checkpoints may be flushed in response to the misprediction, as they no longer represent valid sets of register mappings, as at least some of the speculative register mappings in those post-misprediction register mapping checkpoints could have been updated based on incorrectly predicted instructions. By flushing (e.g. invalidating) post-misprediction register mapping checkpoints in response to a misprediction this frees up space in the checkpoint storage for subsequent checkpoints, and avoids incorrect processing results One issue that arises when a misprediction is handled and speculative register mappings are restored based on checkpointed registered state is that the group tracking information recorded by the register group tracking circuitry will have been updated based on micro-operations past the mispredict point, which may have been incorrectly executed, and so it may not be clear what values to reset to the group tracking information so that the group tracking information corresponds to the mispredict point. One approach could be to record history information which logs each change in the group tracking information recorded by the register group tracking circuitry in association with the corresponding micro-operations that were executed so that it is possible to restore the tracking information to the state associated with any previously executed micro-operation when a misprediction occurs. However, this history information may be relatively expensive to maintain in terms of circuit overhead and power consumption. In practice, this overhead may not be justified and it is possible to use a less precise technique to decide the values to restore to the tracking information when handling a misprediction.

In particular, when at least one post-misprediction register mapping checkpoint is flushed, the flushed post-misprediction register mapping checkpoint may have been associated with checkpoint state information indicating which groups of logical registers have their speculative register mappings included in that register mapping checkpoint. The oldest post-misprediction register mapping checkpoint, (which is the oldest among any register mapping checkpoints which are associated with a younger point of execution than the mispredict point) will have its checkpoint state information which indicates any groups of logical registers whose mappings have changed since the last checkpoint was taken. On handling a misprediction, the youngest pre-misprediction register mapping checkpoint may be used for the restoration and the checkpoint state information associated with oldest post-misprediction register mapping checkpoint will indicate any groups of logical registers whose mappings changed after the restore point of execution, and this will include at least those groups of logical registers which changed due to micro-operations between the restore point and the misprediction point. While the checkpoint state information associated with the oldest post-misprediction register mapping checkpoint may also specify some register groups whose mappings changed due to mispredicted micro-operations executed after the misprediction checkpoint, this inaccuracy is not a problem because if the tracking information is updated to indicate that those registers have changed even though none of the correctly executed instructions up to the misprediction point actually changed those register mappings, then this will just lead to a subsequent checkpoint capturing speculative register mappings for some additional logical registers which were not actually required, but this will not lead to incorrect program execution because the restoration will have restored the correct values of those register mappings, reversing any incorrect changes made for micro-operations younger than the mispredict point. The energy cost of saving some unnecessary register mappings in the next checkpoint may be less than the energy cost that will be associated with maintaining precise history information to track each change to the tracking information.

Hence, when at least one register mapping checkpoint is flushed in response to misprediction, the register group tracking circuitry may update the tracking information based on the checkpoint state information associated with the oldest post-misprediction register mapping checkpoint. While this may introduce some inaccuracy, this is a conservative inaccuracy which only adds to the amount of state saved in the next captured checkpoint, but does not lead to incorrect program execution. This approach can be more efficient in the amount of circuit hardware logic required.

When resetting the tracking information based on the checkpoint state information associated with the oldest post-misprediction register mapping checkpoint, the register group tracking circuitry may update the tracking information to indicate as a changed group of logical registers any group of logical registers indicated by the checkpoint state information as being included in the oldest post-misprediction register mapping checkpoint. Also, the register group tracking circuitry may indicate as an unchanged group of logical registers any group of logical registers indicated by the checkpoint state information as being excluded from the oldest post-misprediction register mapping checkpoint.

In cases when no register mapping checkpoints have been captured since the mispredict point of execution, then the register group tracking circuitry may simply retain a current value of the tracking information, so that when execution resumes after handling of the misprediction, the tracking information is the same as the tracking information which was updated based on the mispredicted flow of execution prior to the misprediction being detected. Again, while this contains some inaccuracies as the tracking information reset when the misprediction is resolved may specify some changed groups of registers which only changed due to mispredicted micro-operations, this merely leads to some additional speculative register mappings being captured in the next checkpoint which would not actually have been necessary, but program execution would still be correct.

The register group tracking circuitry may update its tracking information at rename (or dispatch) time for a given micro-operation. Hence when a micro-operation is encountered that specifies a destination logical register, the register group tracking circuitry may set the tracking information to indicate that a group of logical registers including the destination logical register of that micro-operation is one of the changed groups of logical registers (if that group of logical registers had not been marked as a changed group of logical registers already). Some micro-operations may specify two or more destination logical registers and so they may require more than one group of logical registers to be identified as changed groups of logical registers.

FIG. 1 schematically illustrates an example of a data processing apparatus 2 which has a processing pipeline 4 having a number of pipeline stages 6 to 16. In this example the pipeline stages include a fetch stage 6, a decode stage 8, a rename stage 10, an issue stage 12, an execute stage 14 and a write back stage 16. The pipeline 4 is an out-of-order pipeline which supports out-of-order processing of micro-operations, where micro-operations can be executed in a different order to the program order in which corresponding instructions are stored in memory.

The fetch stage 6 fetches program instructions from an instruction cache 20 for processing by the pipeline. A branch predictor 22 is provided to predict outcomes of branch instructions before their actual outcome is resolved at the execute stage 14, so that the fetch stage 6 can start fetching instructions beyond the branch based on the prediction of the branch predictor 22 before the actual outcome is known. This improves performance compared to the case where fetching of an instruction only began once the actual branch outcome was resolved. Instructions fetched speculatively based on the branch prediction may be processed speculatively by the remaining stages of the pipeline and if a branch prediction is incorrect then these instructions may be incorrectly executed and the misprediction may need to be resolved by flushing subsequent instructions and rewinding the pipeline to an earlier point of execution.

The fetched instructions pass from the fetch stage 6 to the decode stage 8, which decodes the instructions to identify micro-operations to be passed to remaining stages of the pipeline. Some instructions may have a 1-to-1 mapping between the program instructions fetched from the instruction cache 20 and the micro-operations passed down the pipeline by the decode stage 8. Other instructions may have a 1-to-many or many-to-1 mapping between program instructions and micro-operations. For example a complex instruction which involves processing operations at two or more different functional units could be split into multiple micro-operations, or two separate program instructions which have a dependency could be mapped to a single combined micro-operation to be performed as one operation by the remaining parts of the pipeline. Hence the micro-operations (uops) are the form in which instructions are encountered by the later stages of the pipeline.

The rename stage 10 performs register renaming to map logical registers specified by the uops passed from the decode stage 8 to physical registers 24 provided in hardware. The number of physical registers 24 provided in the hardware register bank may be greater than the number of logical registers which can be specified by each micro-operation, to give some spare hardware register space to accommodate storing multiple data values per logical register to capture register state associated with different moments of program execution within the physical register file simultaneously. This can be useful for allowing write-after-write hazards to be eliminated by mapping the same logical register specified in two or more uops to different physical registers of the register file 24. The rename stage 10 may maintain register renaming state information 26 which is used to track not only the current speculative register mappings between logical and physical registers representing the latest speculative point of execution, but also previous non-speculative register mappings which represent the last known correct point of execution. Also the rename stage 10 may be associated with checkpoint circuitry 28 which may handle capture of checkpoints of speculative register mappings for points of execution younger than the commit point of execution representing the last correct point of execution, and handling restoration of previous speculative register mappings based on those checkpoints. This will be discussed in more detail below.

The issue stage 12 queues the uops that have been subject to register renaming while waiting for any required operands to become available in the corresponding physical register file 24 or via forwarding paths from earlier instructions that are further down the pipeline. When all required operands for a given uop are available and there is an available slot in the execute stage for handling that uop, the uop is issued for execution. While FIG. 1 shows the rename stage 10 and the issue stage 12 as two separate stages, other approaches may treat these as a single combined stage which may be called a dispatch stage.

The execute stage 14 executes each uop to perform the corresponding processing operation that is represented by that uop. The execute stage 14 includes a number of functional units 30 to 38 which are for executing different types of uops. For example, the functional units may include an arithmetic/logic unit (ALU) 30 for performing arithmetic or logical operations on integer operands, a floating-point unit 32 for performing operations involving floating-point values, a vector unit 34 for performing processing operations involving at least one vector value which comprises a number of distinct data elements within one register, a branch unit 36 for determining the outcomes of branch instructions and passing results of those instructions back to the branch predictor 22 for training the branch prediction state used to make branch predictions, and for triggering handling of any mispredictions, and a load/store unit 38 for handling transfers of data between the physical registers 24 and the memory system in response to load or store uops. In this example the memory system includes the instruction cache 20, a level 1 data cache 40, a shared level 2 cache 42 which may be used for both data or instructions and main memory 44. It will be appreciated that this is just one example of a possible cache hierarchy and other arrangements could also be provided, such as having additional levels of cache. In response to load uops, the load/store unit 38 transfers data from the memory system to a physical register 24 and in response to store uops data is transferred from a physical register to the memory system. A memory management unit (MMU) 46 is provided to handle address translations and for controlling whether access permissions for accessing certain regions of memory are satisfied. The MMU have at least one translation lookaside buffer (TLB) 48 which may be a cache for caching page table data used to define the address translation mappings or define access permissions for particular regions of the memory address space.

It will be appreciated that the particular set of functional units 30 to 38 shown in FIG. 1 is just one example, and other example arrangements may have different types of functional units or could have more than one instance of the same type of functional units.

The write back stage 16 writes the results of the executed instructions back to the physical register file 24. The write back stage may also track the commitment of instructions once it is known that any speculative results are correct. A reorder buffer 50 may be maintained to track the uops which have been processed, with pointers tracking the point of the reorder buffer representing the commit point of execution and the latest speculatively executed point of execution. On a misprediction, processing state can be rewound back to the mispredict point based on state in the reorder buffer 50.

Figure 2:
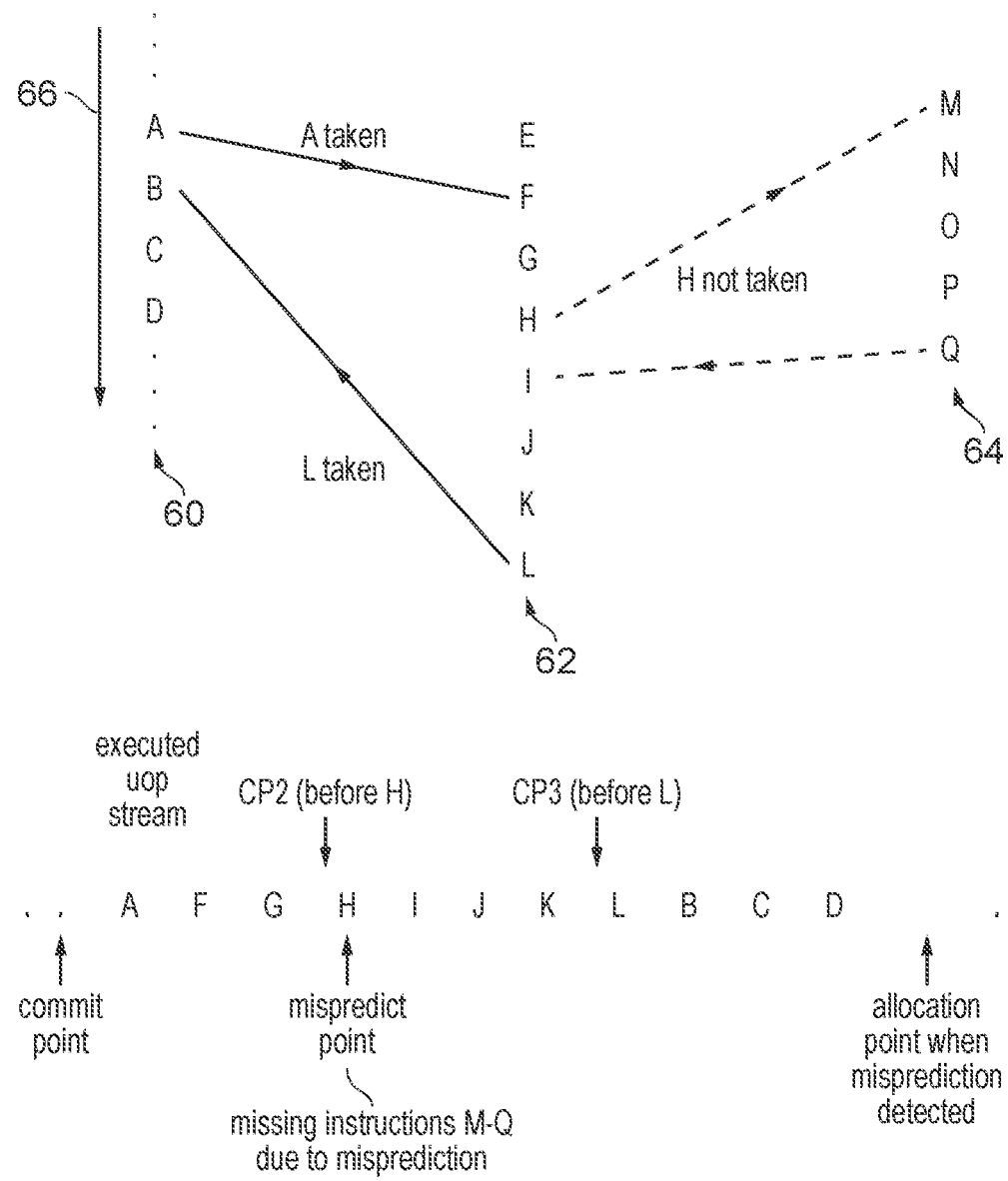
FIG. 2 shows an example of controlling program flow based on branch predictions.

FIG. 2 shows an example sequence of program instructions which will be used later for explaining the register mapping checkpointing. Program execution starts with a sequence of uops 60 which correspond to consecutive contiguous addresses within the memory address space. Hence, in the absence of any taken branches program flow would proceed in the direction shown by the arrow marked 66. However, in this example uop A is branch instruction which is predicted taken by the branch predictor 22 and the branch target address of branch A is an address of an instruction corresponding to a uop F within another sequential sequence 62 of uops. Hence, following uop A the next fetched instruction is decoded to give the uop F, and then program flow proceeds sequentially until a further branch H is reached. In this example, branch H is predicted not taken and so while if it had been taken this would redirect program flow to uops M to Q in a third sequence 64 of contiguous uops, this is not done and instead uops continue to be fetched processed from the sequence 62 beyond not taken branch H. Eventually, at uop L there is a return branch which returns processing to uop B within the first sequence 60.

Hence, as shown at the bottom of FIG. 2, if branch A is predicted taken and branch H is predicted not taken and return branch L is predicted taken then the sequence of executed uops is as follows: AFGHIJKLBCD.

However, it is possible that some of the branches could be mispredicted by the branch predictor 22. For example, if branch H should actually have been taken, but was predicted not taken, then this means that uops M to Q from sequence 64 should have been executed but were omitted from the flow of executed uops, and this could mean that some of the results of the subsequent instructions I to D may have been incorrect because they may have used incorrect values which might have been modified by uops M to Q if they had been executed.

By the time that the misprediction associated with uop H has been identified the subsequent uops I to D may already have been subjected to renaming and executed. The point of execution up to which uops have been allocated to the reorder buffer 50 (and hence already renamed) may be referred to as the allocation point. Not all uops up to the allocation point may yet have executed as some could still be queued for issue. The point of execution corresponding to the predicted branch H may be referred to as the mispredict point. The point of execution corresponding to the uop which was the last in the program order known to have been executed correctly may be referred to as the commit point.

We will return to the example of FIG. 2 when explaining the register renaming and checkpointing scheme as described below.

Figure 3:
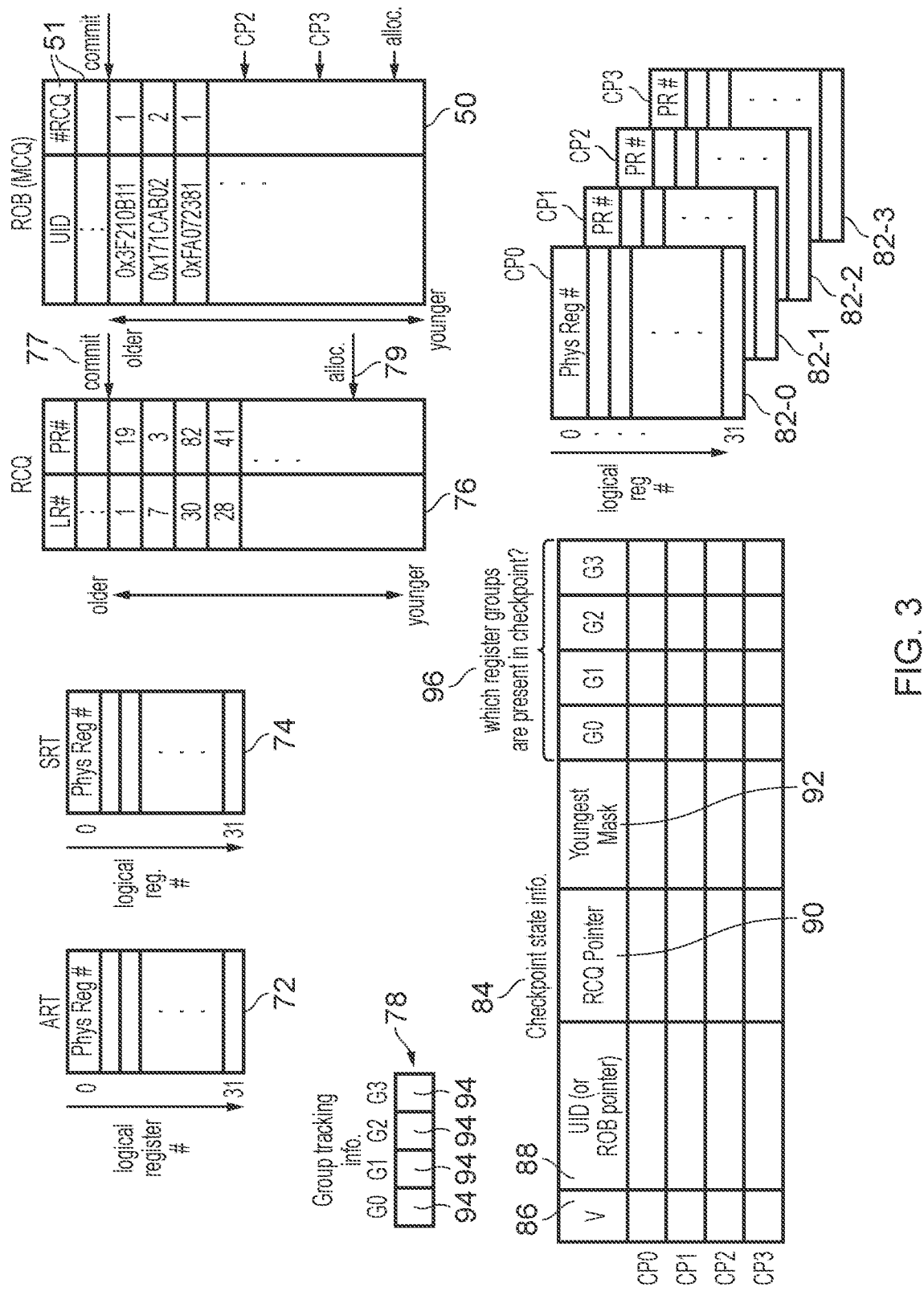
FIG. 3 schematically illustrates an example of state information used to control register renaming and checkpointing of speculative register mappings.

FIG. 3 shows in more detail an example of the reorder buffer 50 (ROB, which can also be referred to as micro-operation commit queue or MCQ), and the rename state information 26 which includes a number of components as illustrated in FIG. 3, including an architectural rename table (ART) 72, a speculative rename table (SRT) 74, a register commit queue (RCQ) 76, group tracking information 78 maintained by group tracking circuitry 80 shown in FIG. 1, a number of captured checkpoints of speculative register mappings stored in checkpoint storage regions 82-0 to 82-3 (collectively referred to as checkpoints 82), and checkpoint state information 84 associated with the captured checkpoints 82. These will each be described in more detail below.

The ART 72 represents the non-speculative logical-to-physical register mappings which were current at the time of processing the uop at the commit point, which is the last uop which is known to have been correctly executed. The ART is a table indexed by logical register number, where each entry specifies the corresponding physical register number which is mapped to that logical register number.

The SRT 74 represents the current speculative logical-to-physical register mappings which are active at the allocation point which represents the most recent uop which has been renamed speculatively. The mappings in the SRT are used for controlling the register reads and write back for speculatively executed uops, while the ART is a backup in case previous mappings need to be restored to handle a misprediction. The SRT 74 has the same format as the ART 72, again comprising an indexed set of entries which are indexed based on logical register number and each specify a corresponding physical register number. In this example the number of logical registers is 32, so that the ART and SRT each comprise 32 entries, but it will be appreciated that is just one example and other architectures may support a greater or smaller number of logical registers.

When a given uop reaches the rename (dispatch) stage 10, a new logical-to-physical register mapping is generated by the rename stage 10 for each destination logical register specified by that uop. Most uops may specify only a single destination register, but there could be some uops that may specify more than one logical register as a destination register. The destination register is a register to be written to in respond to the uop, as opposed to source registers which provide operands for being processed by the uop to determine the result to be written to the destination register. Hence, for each destination logical register specified by the uop, the rename stage 10 selects an available physical register which has not yet been mapped to other uops or is available for reclaiming, and writes the physical register number of the selected physical register to the entry of the SRT 74 which corresponds to the logical register specified as the destination. Also, the new logical-to-physical register mapping is written to the RCQ 76 in the next entry after the last allocated RCQ entry. An allocation pointer 79 indicates the allocation point at which the next RCQ entry is to be allocated, and is updated to point to the next entry each time an RCQ entry is allocated. Hence the RCQ 76 is effectively an ordered queue of successive updates to the speculative register mappings in the SRT 74. The RCQ 76 can provide a full history of changes to the SRT 74 going back to the commit point. Each entry of the RCQ specifies a logical register number and the corresponding physical register number to which that logical register number was remapped by the rename stage 10.

Also, when the rename stage 10 allocates a new physical register to a particular logical register in response to a given uop, an entry for that uop is also assigned to the reorder buffer 50 which specifies a uop ID (UID) uniquely identifying that uop and a count value 51 which identifies how many new entries were allocated to the RCQ in response to that uop. In other words the count value 51 indicates how many destination registers were specified by the uop having the corresponding UID. Hence, in the example of FIG. 3 the reorder buffer is indicating that the oldest uop in the queue specified one destination register, the next uop specified two destination registers, and the next uop one destination register. Both the RCQ 76 and the reorder buffer (ROB) 50 store their entries in age order, for example with pointers representing the commit point and the allocation point.

Micro-operations have their entries retained in the ROB 50 at least until they are committed (it is possible they may be retained for longer than that depending on how long it takes for the corresponding entry to be overwritten after the commit point has overtaken that uop). A uop can be committed when any preceding branches have been resolved as correctly predicted and any operands for the uop are themselves known to be correct (commit could occur either before or after the uop has actually been executed). When a uop is committed the commit pointer can be incremented in the ROB to pass beyond the committed uop to indicate that the corresponding ROB entry can now be overwritten. Also, when a uop is committed the speculative register mappings which were made in the SRT 74 when that committed uop was renamed by the rename stage 10 are written to the ART 72. This is done by checking the count value 51 associated with the entry of the ROB for the committed uop, and then reading the number of RCQ entries indicated by the count value 51 from the RCQ 76, starting at the location of a RCQ commit pointer 77 (the RCQ commit pointer can then be incremented by the number of entries specified by the count value 51). Hence, if the committed uop only had one destination then a single RCQ entry is read from the RCQ and the corresponding logical-to-physical register mapping is written into the ART 72. Uops which have two or more destination registers would have two or more entries read from the RCQ when the uop is committed and this may result in multiple mappings changing in the ART 72.

Hence, the reorder buffer 50 tracks the speculatively executed sequence of uops, and is used to control when those uops can be committed. The RCQ tracks the sequence of updates to the SRT 74 made in response to the speculatively processed uops, which can then be copied to the ART 72 when the corresponding uops are committed.

However, if a misprediction occurs, for example for a mispredicted branch instruction, then the register mappings may need to be rewound to an earlier point of execution to eliminate any updates to the SRT 74 and RCQ 76 which were made based on any incorrectly speculated uops. One approach for handling such mispredictions could be simply that the ART 72 is copied to the SRT 74 when a misprediction is detected and any RCQ or ROB entries beyond the commit pointers are flushed. However, in modern processors the mispredict point may be relatively far past the commit point and so this may waste a lot of correct processing between the commit point and the mispredict point.

A better approach for performance can be to try to recover the changes to the SRT 74 which were made due to the uops between the commit point and the mispredict point based on the RCQ 76. With this approach, when a misprediction is detected, any RCQ or ROB entries beyond the mispredict point can be flushed, but the entries corresponding to uops between the commit and the mispredict point are retained. The contents of the ART 72 could be copied to the SRT 74 when the misprediction is detected and then any RCQ entries which correspond to uops between the commit point and the mispredict point can be walked through to sequentially update the SRT 74 in response to each subsequent change of speculative register mapping which occurred when the uops between the commit point and the mispredict point were dispatched. While the example of FIG. 2 shows only three instructions between the commit point and the mispredict point, in practice there may be a greater number of instructions between the commit point and the mispredict point and so this rebuilding of the SRT based on entries of the RCQ 76 which have to be identified sequentially based on the count values 51 in successive entries of the ROB can be relatively slow.

To reduce the amount of rebuilding of the SRT which has to be performed after restoration based on entries of the RCQ 76, the checkpoint circuitry 28 may capture the checkpoints 82 of speculative register mappings which correspond to points of execution which are younger than the commit point. For example, as shown in FIG. 2 checkpoints could be captured just before branch H and just before return branch L. This means that if a misprediction is detected, it is not necessary to rewind the SRT 74 all the way back to the non-speculative register mappings recorded in the ART 72 which were present at the commit point, as a later checkpoint of speculative register mappings can be used instead to reduce the amount of rebuilding of the SRT 74 which is needed based on the RCQ 76 to account for any changes in speculative register mappings between the point at which the SRT is restored and the mispredict point.

The timings at which such checkpoints 82 are captured can be determined in different ways, depending on the micro-architectural implementation chosen. For example it can be useful to capture checkpoints just before a branch micro-operation. Alternatively checkpoints could be captured at regular intervals of a certain number of micro-operations. Also, in some cases the frequency with which checkpoints are taken may depend on the confidence of a branch prediction associated with a branch operation, as determined by the branch predictor 22, with the window between successive checkpoints being larger for branches with higher confidence than branches with lower confidence. When a checkpoint is captured, speculative register mappings may be copied from the SRT 74 to the storage region 82-0 to 82-3 for a corresponding checkpoint. Each checkpoint 82 may have associated with it a certain number of storage elements of sufficient capacity to store the entire contents of the SRT 74. In the example of FIG. 3, four regions 82-0 to 82-3 are provided for capturing four different checkpoints at different points of program execution. Clearly, four is just one option and other implementations may support more or fewer checkpoints.

Each checkpoint 82 may be associated with a set of checkpoint state information 84 indicating properties of that checkpoint. For example the checkpoint state information 84 may include a valid field 86 which indicates whether the corresponding checkpoint is valid; a UID or ROB pointer field 88 which represents either the UID of the uop at the point of execution for which the checkpoint was captured, or a pointer to the entry of the reorder buffer 50 corresponding to that uop; a RCQ pointer 90 which points to the location in the RCQ 76 corresponding to the point at which the checkpoint was taken; and a youngest mask 92 which can be used to determine which of several checkpoints is older or younger. These will be discussed in more detail in the examples below. In general the RCQ pointer 90 can be used to identify, on restoring state from a given checkpoint 82, which RCQ entries still need to be applied to the SRT to account for changes in register mappings between the restore point represented by the checkpoint and the mispredict point. The youngest mask 92 can be used to identify relative age between different checkpoints more quickly than by comparing the UIDs or reorder buffer pointers in field 88. For example the youngest mask could be a simple counter which is set to zero when a checkpoint is first captured and is incremented each time another checkpoint is captured so that the checkpoint with the lowest value of the youngest mask 92 is the most recently captured. However, it can simplify circuit logic for comparing the age of respective checkpoints if the counter is recorded in one hot representation, where only a single bit is equal to 1 and all other bits are equal to 0 and the position of the "1" bit represents the value of the counter. Hence in this case the youngest mask 92 could be initialised with a value which has a 1 in the least significant bit and 0 in all other bits when a checkpoint is first captured, and then each time a subsequent checkpoint is captured all the youngest masks 92 of the other checkpoints may be left shifted by 1 bit so that older checkpoints will have the bit value of 1 at a more significant bit location of the mask than younger checkpoints.

It will be appreciated these are just some ways of representing an age comparison and other techniques could also be used. For example, another approach can be to provide each checkpoint with a youngest mask bitfield with 1 bit per other checkpoint number. If, in the mask stored for a selected checkpoint, the bit corresponding to a given other checkpoint is set to 1, this indicates that the selected checkpoint is younger than the given other checkpoint. Relative age between any 2 checkpoints can be determined simply by checking the appropriate bit. Hence, with this approach, when a new checkpoint is added, the bits corresponding to the new checkpoint in the youngest masks of the other checkpoints are all set to 0, and the youngest mask for the new checkpoint is initialised to all 1.

However, while saving such checkpoints and speculative register mappings can be good for performance by reducing the amount of SRT rebuilding needed following handling of the misprediction, it can be relatively expensive in terms of power to save the entire contents of the SRT to the checkpoint storage 82 relatively frequently. The group tracking information 78 is provided to help reduce the power cost of the checkpointing scheme so that registers for which the register mappings were not updated since the last checkpoint was saved do not need to be captured again in the next checkpoint. This allows for saving of only subsets of registers into a checkpoint through a selective rebuild approach which can allow rebuilding of SRT contents from multiple previous checkpoints.

The group tracking information 78 includes a number of group tracking flags 94 which each correspond to a group of logical registers. For example, in FIG. 3 there are four tracking flags 94 which each correspond to a group of 8 logical registers from among the set of 32 registers, with flag G0 corresponding to logical registers 0 to 7, flag G1 corresponding to logical registers 8 to 15, G2 corresponding to logical registers 16 to 23 and G3 corresponding to logical registers 24 to 31. Also, each entry of checkpoint state information 84 is expanded to include corresponding status flags 96 for each group of logical registers which indicate which register groups have their speculative register mappings included in the corresponding checkpoint 82. For example if checkpoint status flag G0 (96) is set for checkpoint 2 then this indicates that the entries in the storage 82-2 corresponding to checkpoint 2 contain valid speculative mappings for logical registers 0 to 7. On the other hand, if that checkpoint state flag G0 96 was cleared (e.g. set to 0) then this would indicate that the storage elements 82-2 for checkpoint 2 which correspond to logical registers 0 to 7 do not contain valid mappings which would need to be restored to the SRT when that checkpoint is used for restoration.

With this approach then when a given uop is renamed at the rename stage 10, if it updates a given logical register and that logical register has its physical register mapping changed by the rename stage 10, then the corresponding group tracking flag 94 for the group of logical registers including the destination logical register that was remapped is set to 1 if it was not already set, to indicate that the group of logical registers including the remapped logical register has changed its mappings since the last time a checkpoint was taken. When a checkpoint is taken, the group tracking information 78 is cleared to all 0 to indicate that now none of the register groups have changed their mappings since the last checkpoint was captured. When a new checkpoint is captured, the groups of logical registers which have their group tracking flags 94 set to 1 have their register mappings copied from the SRT to the corresponding checkpoint storage 82, and the group status flags 96 in the checkpoint state information 84 for the new checkpoint would be set based on the values in the group tracking information before the checkpoint was captured. Any storage elements in the newly captured checkpoint which correspond to unchanged groups of logical registers which have not changed their register mapping since the last checkpoint was captured do not need to be clocked while the checkpoint is being stored so that the storage element will not switch state and power can be saved.

In summary, given a checkpointing implementation that captures a large register mapping state fairly often, it is desirable to avoid clocking all flops in a checkpoint storage domain, when in many cases a significant number of registers were not updated since the last checkpoint was saved. The described scheme allows for saving off only subsets of registers into a checkpoint, through a selective rebuild approach that can rebuild speculative rename table contents from multiple previous checkpoints.

At instruction dispatch, consider groups of logical register destinations:
    If a uop updates a register in a given group, set a sticky bit indicating that group has seen an update since the last checkpoint was saved
    Clear these group update sticky bits upon saving a new checkpoint Upon taking a checkpoint:
    For each logical register group, save a bit in the Checkpoint Table entry indicating whether that particular group is saved in the new checkpoint.
    Only clock the Checkpoint flops needed to capture the register mapping states corresponding to the register group(s) that had seen updates since the last checkpoint.

At flush:
    A single checkpoint is chosen, pointing to the youngest valid checkpoint prior to the flush point. The UID from this checkpoint is used to limit the range of ROB/RCQ entries that need to be walked at rebuild time.
    For restoring the speculative rename table, however, logical register groups make their own, independent determination of which Checkpoint number to restore from.
    Logical register groups filter and examine those checkpoint numbers that have the bit set indicating that they contain updates to this particular group. Those filtered checkpoints are then age filtered to find the youngest checkpoint with updates to a particular register group.
    Each register group uses that individually filtered result to choose where to restore speculative rename state from. Thus, full register state restore is effectively pieced together by register group, from multiple previously saved checkpoints.
    The group-specific restore checkpoint can be older than the checkpoint used to seed the ROB/RCQ rebuild walk (which is done to capture and rebuild any updates since the most recent checkpoint prior to the mispredicting branch). Thus, for a given register group, there can be a range of ROB/RCQ entries between the group's restore checkpoint and the rebuild-walk start point that do not get considered for rebuild. That does not present a problem though, since if they had contained updates for the given register group, then some younger checkpoint candidate would have had to have had its "this-group-was-updated" bit 96 set and would have been included in this group's filtering analysis.

The sticky group update bits 78 tracked at the dispatch point may need to be reset on restoring checkpoints:
    Since a flush can occur at an arbitrary point between checkpoints, it is not immediately evident what state the tracking flags 94 should be in immediately following a flush. (e.g. the mispredicting branch could have been partway in program order between the last checkpoint state and the current dispatch point, or somewhere between 2 previous checkpoints, etc.)
    A precise reconstruction of the sticky group-update bits at Dispatch would require careful analysis of ROB/MCQ contents, which would be logically expensive.
    Instead: If 1 or more checkpoints were themselves flushed, due to being younger than the mispredict point, then the group update bits 96 for the oldest of the flushed checkpoints is copied to the sticky group-update bits 94. If no checkpoints were flushed, then the current sticky bits 94 are held. In both cases, this approach can contain inaccuracies, but they are conservative inaccuracies that only add to the amount of state saved in the next captured checkpoint.

Figure 4:
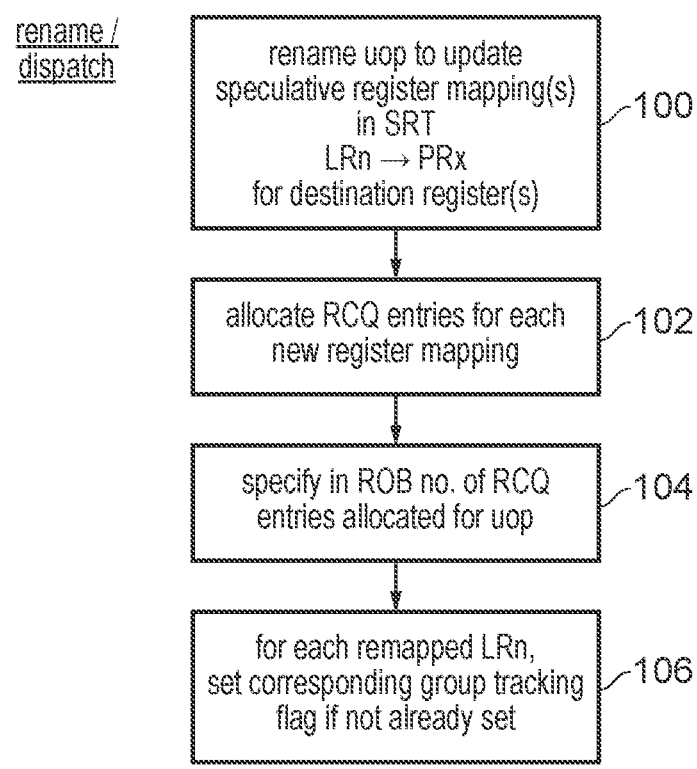
FIG. 4 is a flow diagram showing renaming operations performed for a given micro-operation.

FIG. 4 is a flow diagram showing operations performed by the rename (despatch) stage 10 of the pipeline. At step 100 the rename stage 10 take the next micro-operation to be processed and remaps each destination logical register specified by the uop to a new physical register. Hence for each destination logical register LRn, a new physical register PRx which is selected from a pool of available registers which is not currently mapped to a logical register either in the SRT 74 or the ART 72 or any of the currently captured checkpoints 82. Some uops may specify more than one destination register and in this case two or more new logical-to-physical register mappings may be generated. The SRT 74 is updated to indicate the new speculative register mappings generated for the latest uop, with each entry of the SRT 74 corresponding to a renamed logical register LRn being updated to specify the corresponding physical register PRx selected by the rename stage 10.

At step 102 the rename stage 10 allocates a new RCQ entry to the RCQ 76 for each new register mapping generated at step 100. The newly allocated entries are allocated at the positions starting from the current value of the allocation pointer 79 and the allocation pointer is updated to move to the position beyond the last new allocated RCQ entry allocated for the current uop. Each allocated RCQ entry specifies the logical register LRn and the corresponding physical register PRx that was selected for remapping the logical register LRn.

At step 104 a reorder buffer entry is allocated to the ROB 50 for the renamed uop, specifying the UID of the uop and the count value 51 identifying the number of RCQ entries which were allocated for the uop at step 102. It will be appreciated that the ROB entry could also specify other information not described here, dependent on the particular micro-architectural implementation.

At step 106, the group tracking circuitry 80 sets, for each remapped logical register LRn, the corresponding group tracking flag 94 if that flag is not already set. That is, the group tracking flag which corresponds to a group of logical registers which includes the remapped logical register LRn is set to 1. This indicates that the group including logical register LRn is a changed group which has changed at least one speculative register mapping since the last checkpoint 82 was captured. It will be appreciated that FIG. 4 only shows some of the functions within rename stage 10 and other operations may also be performed. For example the rename stage 10 may maintain tracking state within the rename state information 26 which tracks which physical registers have already been allocated and may monitor when previously allocated physical registers can be reclaimed to become available for remapping to a new logical register.

Figure 5:
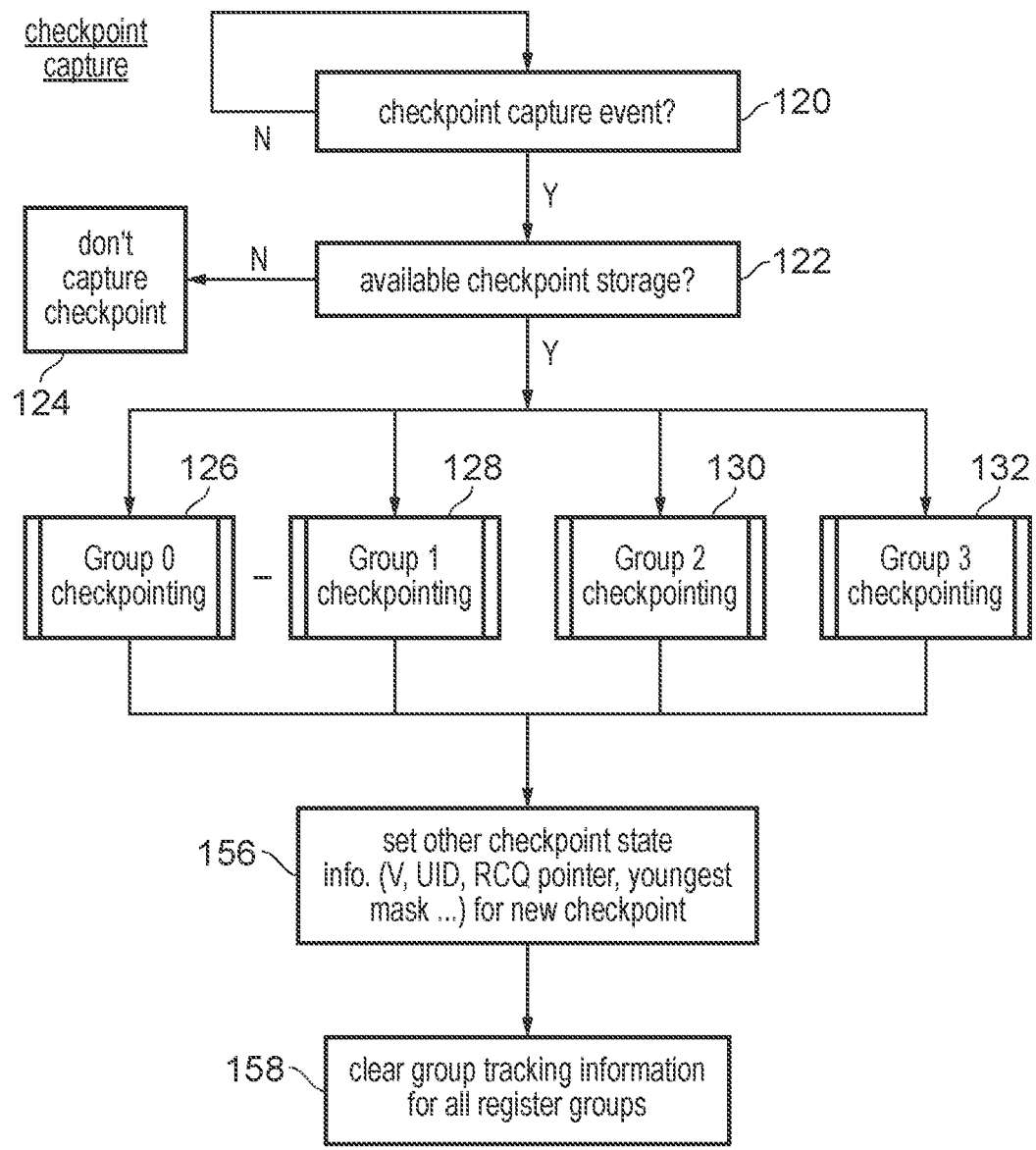
FIG. 5 is a flow diagram showing a method for capturing a checkpoint of speculative register mappings.

FIG. 5 is a flow diagram showing operations performed by the checkpoint circuitry 28 to capture a new checkpoint of speculative register mappings. At step 120 the checkpoint circuitry 28 determines whether a checkpoint capture event has occurred. The checkpoint capture event could be a range of different types of events. In one example the checkpoint capture events may be the elapse of a certain period of time or number of processing cycles since the last checkpoint was captured. Also the checkpoint capture event could be the processing of a certain number of uops since the last checkpoint was captured.

In another example, the checkpoint circuitry 28 could maintain a counter tracking how many new logical-to-physical register mappings have been generated by the rename stage 10 (or equivalently, how many new RCQ entries have been allocated to the RCQ 76) since the last checkpoint was captured. In some examples this count value could be used to trigger capture of a new checkpoint if more than a certain number of new register mappings have been generated.

However, in another example, the checkpoint capture event could be the processing of a branch uop which meets certain conditions. As branches are the points of the program flow where mispredictions may be likely to arise, it can be useful to capture a checkpoint of the current speculative register mappings from the SRT 74 at the point corresponding to the branch. Hence, in some examples checkpoints could simply be captured on each branch. However, in practice branches may sometimes be relatively frequent within the program code and if checkpoints are captured too frequently then this may incur a lot of power in updating the checkpoint storage 82-0 to 82-3 and the checkpoint state information 84. Hence in some cases the branch triggering of checkpoint capture could be qualified by the count value mentioned above which counts the number of generated new register mappings. Also, whether or not a branch should trigger checkpoint capture may depend on the confidence in the branch prediction generated for the branch by that branch predictor 22. For branches with lower confidence it may be desirable to capture checkpoints more frequently than branches with higher confidence, since for higher confidence branches there is less chance that the branch prediction will be incorrect and so it can be desirable to capture checkpoints less frequently to save power whereas for lower confidence branches the extra power of capturing more frequent checkpoints may be justified given the higher likelihood that it may be needed to restore previous register mappings on a branch misprediction. Hence, in some cases the count value tracking the generated number of new register mappings could be used in combination with the confidence assigned to a branch uop by the branch predictor 22 to determine whether or not the checkpoint capture event has occurred. Hence in this example the checkpoint capture events may be either:

- a branch uop whose confidence is lower than a certain confidence threshold, when at least J new destination register mappings have been generated by the rename stage 10 since the last checkpoint was taken, or
- a branch uop whose confidence is higher than the confidence threshold, for which at least K new destination register mappings have been generated by the rename stage 10 since the last checkpoint was taken, where K is greater than J.

Another example of a checkpoint capture event could be an exception or interrupt, which causes processing to break out from the current program flow and switch to an exception handler routine which may itself change the register mapping, and so it may be desirable to checkpoint the register mappings just before switching to the handler.

It will be appreciated that these are just some examples of events which could trigger capture of a new checkpoint and others could also be used. Regardless of the type of checkpoint capture event, if a checkpoint capture event has been detected then at step 122 the checkpoint circuitry 28 determines whether there is an available checkpoint storage unit 82-0 to 82-3 which has not already been allocated for storing a valid checkpoint. This is determined by checking the valid bits 86 stored for each checkpoint 82 in the checkpoint state information 84. If there is no available checkpoint storage then at step 124 it is determined not to capture any new checkpoints and instead the previously captured checkpoints may be retained. Performance studies have shown this behaviour to be acceptable and by avoiding needing to implement a replacement policy algorithm for replacing older checkpoints with newer checkpoints this can save circuit logic. However other examples could also decide to evict the oldest checkpoint or use a different replacement policy to determine which of the previously captured checkpoints should be evicted, and then use the storage region 82-0 to 82-3 that stored the evicted checkpoint for storing newly captured checkpoint to be captured in response to the latest checkpoint capture event.

If there is available checkpoint storage (or if a replacement policy was implemented, a checkpoint storage region has been made available by evicting a previously captured checkpoint in the event that there was no available checkpoint storage), then a checkpoint is able to be captured and the method proceeds to steps 126 to 132 which perform separate, per-group, decisions on checkpointing. Each of the steps 126, 128, 130, 132 is the same but performed for a different group of logical registers. In this example group 0 corresponds to logical registers 0 to 7, group 1 corresponds to logical registers 8 to 15, group 2 corresponds to logical registers 16 to 23 and group 3 corresponds to logical registers 24 to 31.

Figure 6:
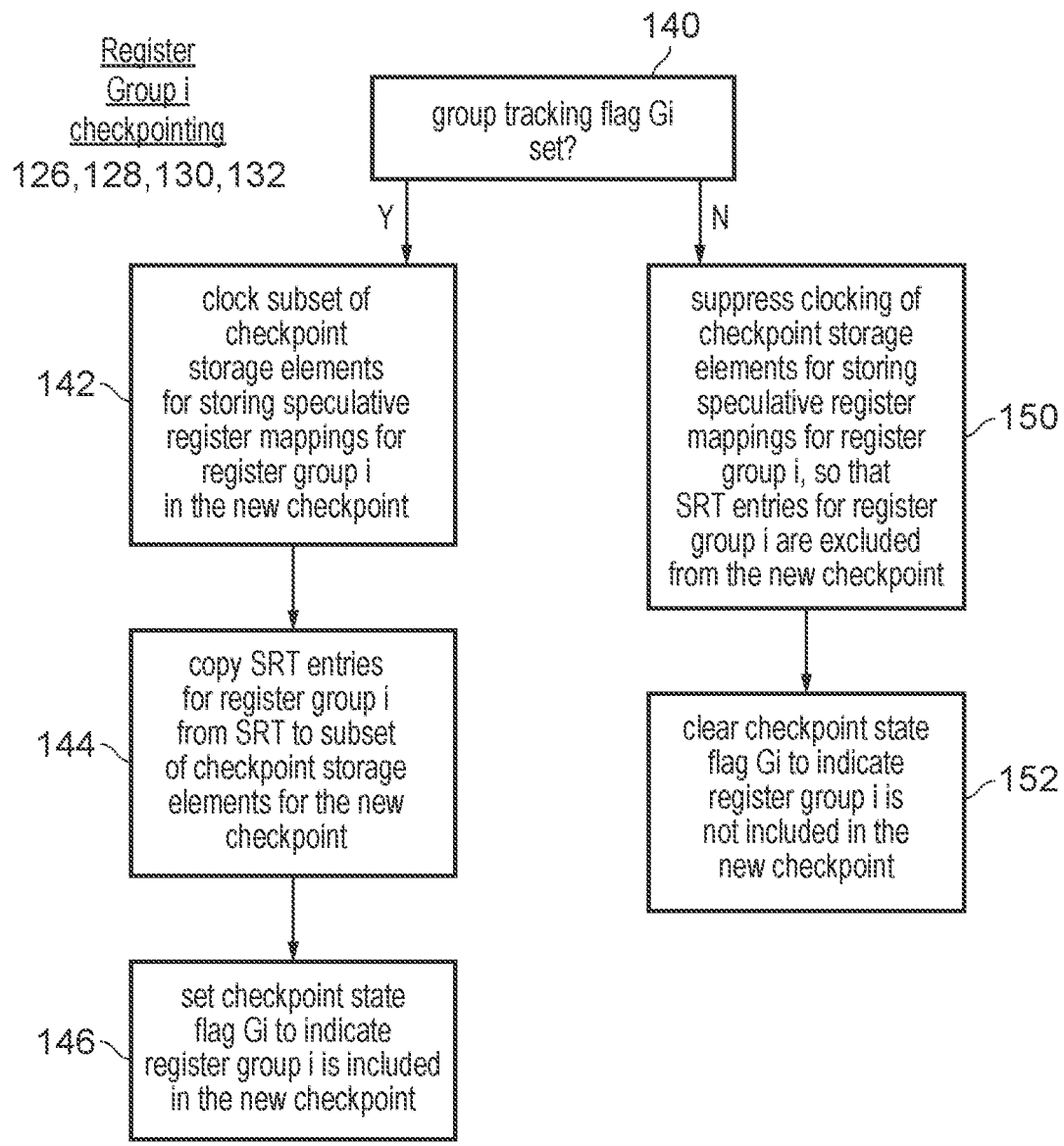
FIG. 6 shows in more detail actions taken for a particular group of registers during checkpoint capture.

FIG. 6 shows in more detail the operations performed by each of the steps 126 to 132 for the corresponding group i of logical registers, where i is 0, 1, 2 or 3 in the example of FIG. 5. Of course, other examples could divide the logical register space into a different number of groups or allocate different sizes of groups of registers and so having four groups as shown in FIG. 5 is just one option.

As shown in step 140 of FIG. 6, for a given group i of logical registers, the checkpoint circuitry 28 determines whether the group tracking flag Gi 94 in the group tracking information 78 is currently set to indicate that group i is a changed group of logical registers for which at least one register in that group has had its speculative register mapping changed in the SRT 74 since the last checkpoint was taken.

If it is determined that the group tracking flag 94 (Gi) for register group i is set then at step 142 the group tracking circuitry 80 controls clock generating circuitry to clock a subset of checkpoint storage elements within the selected storage region 82-0 to 82-3 which was selected for handling the new checkpoint. The clocked subset of checkpoint storage elements are the elements which would store the speculative register mappings for the logical registers in group i for the new checkpoint. At step 144 the SRT entries for the logical registers in group i are copied from the SRT 74 to the clocked subset of checkpoint storage elements for the new checkpoint, so as to store these to one of the checkpoint storage regions 82-0 to 82-3. At step 146 the checkpoint state flag Gi 96 which corresponds to logical register group Gi for the newly allocated checkpoint is set within the checkpoint state information table 84. For example if the checkpoint storage region selected for storing the new checkpoint is region 82-2 then the checkpoint state flag Gi which corresponds to the entry for checkpoint 2 would be set within the checkpoint state information table 84.

On the other hand, if at step 140 it was determined that the group tracking flag for group Gi was clear, indicating that group i was an unchanged group of logical registers which has not had any of its register mappings changed since the last checkpoint was taken, then at step 150 the checkpoint circuitry 28 suppresses clocking of the subset of checkpoint storage elements within the selected checkpoint storage region 82 which would otherwise have stored the speculative register mappings for register group i. This means that the SRT entries for register group i are excluded from the newly stored checkpoint because by not clocking the checkpoint storage elements then any commands to write entries to the checkpoint storage region would not change the state stored in the checkpoint storage elements. By not clocking the checkpoint storage elements this saves time.

Also, at step 152 the checkpoint state flag 96 corresponding to logical register group Gi within the checkpoint state information 84 is cleared to indicate the register group i is not included in the new checkpoint.

Note that while the branch of FIG. 6 including steps 150 and 152 selected when the group tracking flag for register group Gi is clear does not include a step of copying SRT entries as shown in step 144 for the case when the group tracking flag is set, in practice it would be appreciated that the circuit logic may simply command that all of the SRT entries are copied from the SRT 74 to the checkpoint storage region 82 selected for storing a new checkpoint, but the suppression of the clocking of a subset of checkpoint storage elements at step 150 may effectively mean that those checkpoint entries which correspond to unchanged groups of logical registers will not be updated. Hence, it is not essential for the logic which controls the reading of register mappings from the SRT 74 or the writing of the register mappings to the checkpoint circuitry to take account of whether the group tracking flags indicates that sets of registers are changed or unchanged as the activation or suppression of the clocking of a subset of checkpoints storage elements for a given register group may be enough to ensure that unchanged groups of logical registers do not have their register mappings saved in the checkpoint. Alternatively, in other examples the group tracking flags could also control whether the read from the SRT 74 takes place for a given group of logical registers, and if the read can also be suppressed for an unchanged group of logical registers then this may further save power.

Hence, the operations shown in FIG. 6 are performed separately (either in parallel or sequentially) for each group of logical registers at the respective steps 126, 128, 130, and 132 of FIG. 5.

Returning to FIG. 5, at step 156 the checkpoint circuitry sets other checkpoint state information 84 for the newly captured checkpoint. For example the valid bit 86 is set to 1 to indicate that the new checkpoint is valid, and the UID or ROB pointer 88 is set to match the UID of the current uop or the corresponding pointer to the ROB entry for that UID. Also the RCQ pointer 90 for the new checkpoint is set based on the current value of the allocation pointer 79 associated with the RCQ 76, to mark the entry which represents the point of execution at which a checkpoint is taken. The youngest mask 92 for the new checkpoints is cleared to an initial value, such as mask with a 1 at the least significant bit and 0s at all other bit positions. At the time of setting a new checkpoint the youngest mask 92 for all the other previously captured checkpoints are updated, for example by left shifting the mask by one bit position to indicate that these other checkpoints are older than the latest captured mask. Using a mask encoded as a onehot field can be simple for control logic to read, but other implementations could use a counter represented as a binary number instead, to track which of the checkpoints is the youngest. Also, another example could set the youngest mask 92 for the new checkpoint to a value where all bits are 1, and update the other checkpoint's masks to clear to 0 any bits corresponding to the new checkpoint. It will be appreciated that at step 156 other checkpoint state information could also be stored in association with the latest captured checkpoint, depending on the particular needs of a given micro-architecture. Hence, FIG. 3 does not necessarily show a complete record of all the state information 84 stored for a given checkpoint. Note that following the completion of steps 126, 128, 130, 132 the checkpoint state flags 96 will indicate which groups of logical registers were included in the checkpoint and which were excluded because they have not changed since the previous checkpoint was taken.

At step 158 of FIG. 5, having captured the latest checkpoints, the group tracking information 78 is cleared to indicate that all register groups are now unchanged groups of logical registers. Also any tracking information used to track whether a checkpoint capture event has occurred at step 120 may also be reset, such as the count value which counts the number of generated new logical to physical register mappings.

Figure 7:
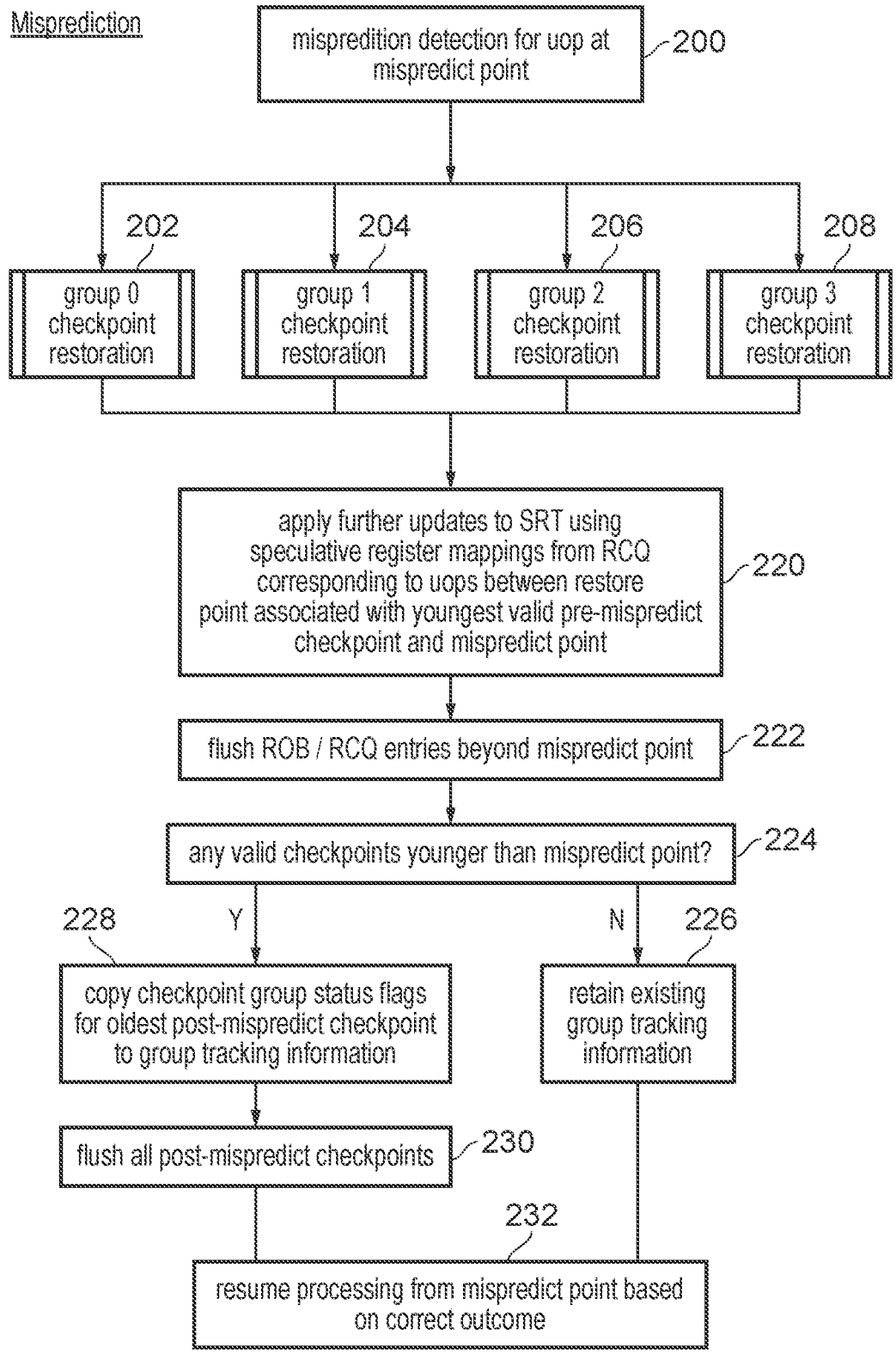
FIG. 7 is a flow diagram showing a method of responding to detection of a misprediction.

FIG. 7 shows operations performed by the checkpoint circuitry 28 in response to a misprediction being detected. The misprediction could be any determination that speculation has been incorrect. For example, this can be a mispredicted branch identified by the branch unit 36, for which the actual branch outcome is different from the predicted outcome determined by the branch prediction 22. Other examples of mispredictions could be in systems which support load value speculation, where a prediction is made as to the expected value to be loaded from memory before the actual value becomes available, which can speed up processing of subsequent instructions when the speculation is correct. Regardless of the cause of the misprediction, at step 200 of FIG. 7, the checkpoint circuitry 28 receives a signal indicating that a misprediction has occurred and so some changes to the SRT 74 may have been incorrect. The pipeline 4 will have mechanisms for rewinding the flow of uops execution to an earlier point of the program flow to eliminate the incorrectly speculated uops and resume processing from the misprediction point based on the correct outcome. Any known technique for halting and resuming program flow in the pipeline can be used. FIG. 7 shows the actions performed for restoring speculative register mappings to the SRT 74 when a misprediction is detected, but it will be appreciated other non-rename related actions may also be performed in response to a misprediction (e.g. retraining branch prediction state).

Figure 8:
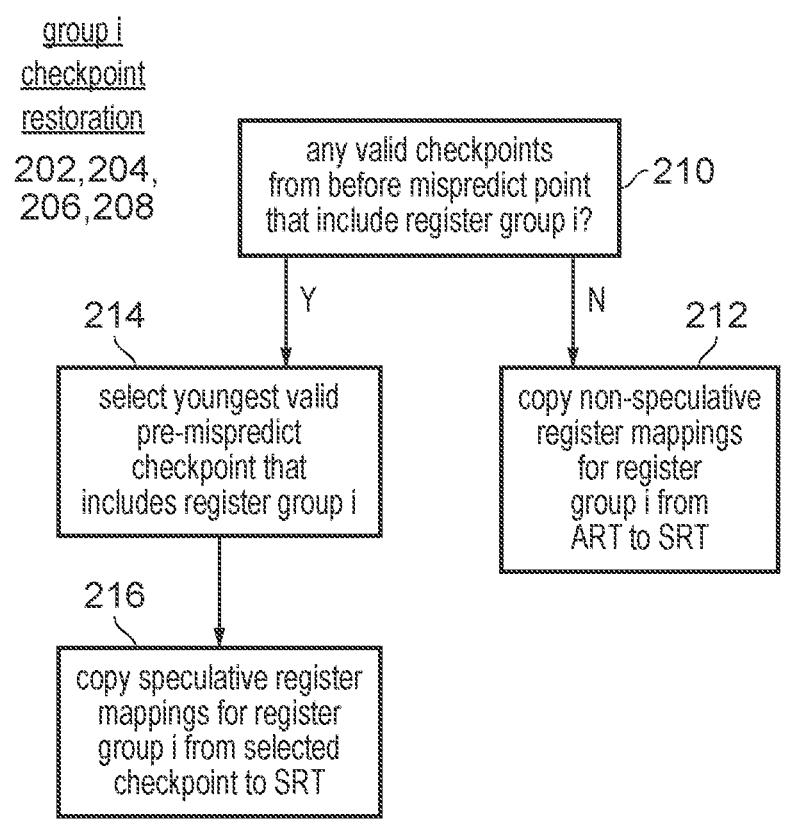
FIG. 8 is a flow diagram showing in more detail steps performed for checkpoint restoration for a given group of logical registers.

In response to the misprediction, the checkpoint circuitry 28 triggers a number of separate, per register group, actions for determining how to restore the speculative register mappings for a corresponding group of logical registers. These are performed separately at steps 202, 204, 206, 208 for the groups 0 to 3 as identified above. FIG. 8 shows the operations performed for each of steps 202 to 208 for a given logical register group i. It will be appreciated that steps 202, 204, 206, 208 could be performed in parallel with each other by the checkpoint circuitry 28, or could be performed sequentially, but performing them in parallel will improve performance.

Hence, at step 210 of FIG. 8, for a given logical register group i, the checkpoint circuitry detects based on the checkpoint state information 84 whether there were any valid checkpoints which were captured at a point of execution before the mispredict point, which includes the checkpointed speculative register mappings for logical register group i. That is, any checkpoints for which either the valid bit 86 is clear or for which the one of the group status flags 96 which corresponds to logical register group i is clear will not be considered at step 210, and from any remaining checkpoints, it is determined based on the UID or ROB pointer 88 whether those checkpoints are from an older point of execution than the mispredict point (with reference to information from the ROB 50 if necessary).

If there are no valid checkpoints from a point of execution before the mispredict point which include register group i, then at step 212 the non-speculative register mappings for logical register group i are copied from the ART 72 to the SRT 74, as this will indicate that either no checkpoints had been taken at all between the commit point and the mispredict point, or if any checkpoints had been taken, those checkpoints did not include the mappings for logical register group i because all the speculative register mappings were unchanged since the commit point for the logical register group i. Hence, in this case the ART will provide the register mappings for logical register group i which were current in the SRT 74 at the time that the youngest checkpoint which preceded the mispredict point was taken.

If there are any valid checkpoints which are pre-misprediction checkpoints, that were captured at a point before the mispredict point, and which include the speculative register mappings for logical register group i, then at step 214 the checkpoint circuitry 28 selects, based on the youngest mask 92 of any of these checkpoints, which of these valid pre-misprediction checkpoints is the youngest valid pre-misprediction checkpoint that includes register group i. For example, the one of the valid pre-misprediction checkpoints that includes register group i that has the lowest value of the age counter or youngest mask 92, can be selected at step 214. At step 216 the speculative register mappings for logical register group i are copied from the storage region 82 for the checkpoint selected at step 214 into the corresponding entries of the SRT 74.

The operations shown in FIG. 8 are performed separately for steps 202 to 208 for the respective groups of logical registers so that it is possible that some registers may have their mappings copied from one checkpoint and others could be copied from another checkpoint, so that the SRT is rebuilt based on merging of entries from multiple checkpoints. Also, some logical register groups could be copied from the ART whereas others come from checkpoints. By permitting merging of captured checkpoint mappings from different checkpoints and/or the ART, this means it is not essential for each checkpoint to provide a complete view of the speculative register mappings at a given point to program execution, so that power can be saved by not copying SRT entries into a checkpoint on checkpoint capture if those mappings have not changed since the last checkpoint.

Returning to FIG. 7, having performed the per-group checkpoint restoration actions at steps 202 to 208, at step 220 further updates are made to the SRT 74 using speculative register mappings from the RCQ 76 which correspond to uops between the restore point associated with the youngest valid pre-misprediction checkpoint and the mispredict point. If none of the checkpoints were valid checkpoints older than the mispredict point (i.e. the answer at step 210 of FIG. 8 is NO for all of the logical register groups in each of steps 202, 204, 206, 208) then the restore point would be the commit point, as all logical register groups would have their mappings copied from the ART to the SRT. However, if checkpoints are captured reasonably frequently then this can reduce the chance that there will be no valid pre-mispredict checkpoints at all, which can help to reduce the number of updates needed based on the RCQ.

In more detail, at step 220 the UID or reorder buffer pointer 88 from the youngest valid pre-mispredict checkpoint is used to identify the restore point in the reorder buffer 50 and then each reorder buffer entry between the restore point and the mispredict point is successively read from the reorder buffer 50. For each read reorder buffer entry, the number of RCQ entries indicated by the count value 51 associated with that reorder buffer entry is read from the RCQ 76, starting from a location identified by the RCQ pointer 90 associated with the youngest valid pre-misprediction checkpoint. For any read RCQ entries, the entry of the SRT 74 corresponding to the logical register specified in the read RCQ entry is updated based on the physical register specified in the read SRQ entry. Hence, by walking through the reorder buffer 50 and the RCQ 76, the SRT 74 can be rebuilt from the restore point up to the speculative register mappings which were current at the mispredict point. By using checkpoints instead of having to use the ART 72 every time to restore the SRT, this reduces how many of these RCQ-based updates are needed.

At step 222 the checkpoint circuitry triggers any reorder buffer entries or RCQ entries to be flushed from the ROB 50 and RCQ 76 from beyond the mispredict point, as these entries correspond to incorrectly speculated uops.

At step 224 the checkpoint circuitry 28 determines whether there are any valid checkpoints which were younger than the mispredict point. This can either be determined based on a comparison of the UID or reorder buffer pointer identifying the mispredict point and the UID or reorder buffer pointer 88 associated with each valid checkpoint, or could be done based on a comparison between the youngest mask 92 of the youngest valid pre-mispredict checkpoint selected in any of the steps 214 performed for any of the logical groups, and the youngest masks 92 associated with any post-mispredict checkpoint that were not selected as candidates for selection as the youngest valid pre-mispredict checkpoint at step 214.

If there were no valid checkpoints younger than the mispredict point, then at step 226 the existing group tracking information 78 is retained. While this group tracking information could include some group tracking flags 94 which were set due to new register mappings generated for the incorrectly speculated instructions which are flushed from the pipeline, this is not a problem, since any inaccuracy in indicating which register mappings have changed for the resumed flow of processing is not a problem as this merely results in additional register mappings being stored to a checkpoint but does not affect program instruction. Retaining the existing group tracking information can be simpler than having to maintain additional state tracking changes in the group tracking information 78 for successive speculatively executed uops so that a precise reconstruction of the group tracking information at a given point of program execution can be restored.

On the other hand, if at step 224 there was at least one valid checkpoint younger than the mispredict point then at step 228 the checkpoint group status flags 96 for the oldest post-mispredict checkpoint (the oldest checkpoint among any valid checkpoints which are younger than the mispredict point) are copied to the group tracking information 78.

These copied status flags will include at least the speculative register mappings which changed as a result of the correctly executed instructions between the restore point and the mispredict point, but could potentially also include some indications of groups of logical registers whose mappings changed due to incorrectly speculated instructions, but again this is not a problem and can be more efficient for reducing circuit logic by avoiding tracking of precise changes in group tracking information. At step 230, any post-misprediction checkpoints are then flushed, for example simply by clearing the valid bit 86 associated with those checkpoints.

Regardless of whether at step 224 any valid checkpoints were identified which are younger than the mispredict point, at step 232 processing can then be resumed from the mispredict point based on the correct outcome of the speculation, the restored, speculative register mappings in the SRT 74 and the updated/retained group tracking information resulting from step 228 or 226.

FIGS. 9 to 13 show a worked example showing how the techniques discussed above could be applied, using the program sequence shown in FIG. 2 as an example. It will be appreciated that this example is greatly simplified and in practice the number of uops processed between successive checkpoints may be greater than shown in these examples, but for the conciseness it is simpler to show fewer changes in the register mappings.

Figure 9:
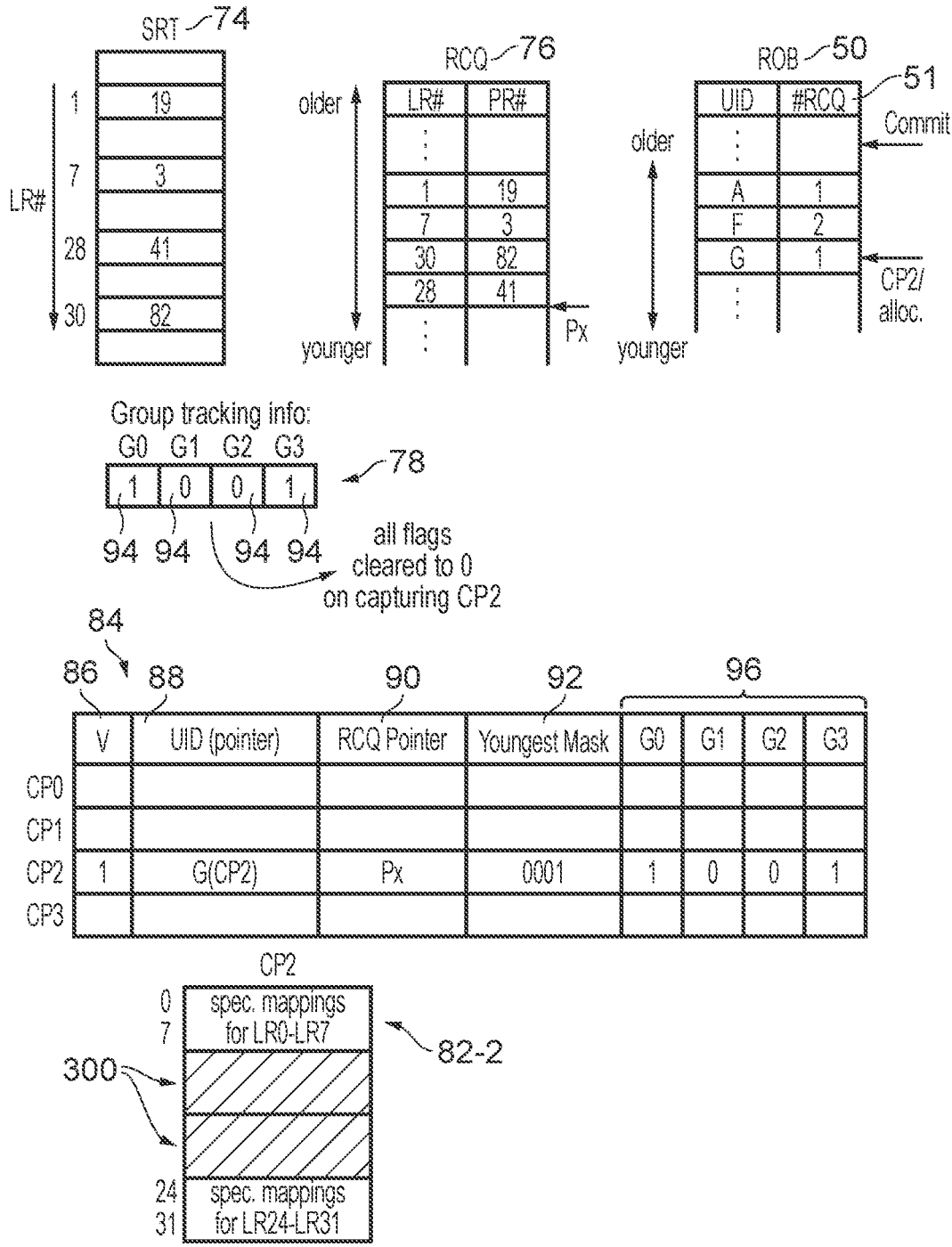
FIGS. 9 to 13 show a worked example based on the program flow shown in FIG. 2.

As shown in FIG. 9, the program flow reaches uop A as shown in FIG. 2 which is a taken branch and this leads to uops F and G being processed. The uops A and G specify a single destination register and uop F specifies two destination registers. Each of the destination registers has its logical register specifier mapped to a different physical register by the rename stage 10 and RCQ entries are allocated for each of the new mappings. Also reorder buffer entries are allocated to the ROB 50 for each of the renamed uops in age order, mapping the UID of each uop to the count value 51 tracking the number of RCQ entries which were allocated for that uop. Note that while in FIG. 9 the letters A, F, G are used as a shorthand for the UID of the corresponding uops for ease of understanding, in practice, the UID will be represented as a binary identifier. FIG. 9 also shows how the SRT 74 has been updated based on the new register mapping so that the SRT entries for logical registers 1, 7, 28, 30 are updated to specify the new physical registers allocated by the rename stage 10. Each time a new register mapping is generated, the group tracking flag 94 is set (if not set already) for the corresponding group of logical registers by the group tracking circuitry. Hence, in this example as uops A, F, G specify logical registers 1, 7, 28 and 30 which are in groups 0 and 3, this results in the flags 94 for groups 0 and 3 being set while flags 94 corresponding to groups 1 and 2 remain clear.

Having processed uop G, a checkpoint capture event is detected, for example because the branch uop H was detected as the next uop and more than a certain number of new register mappings have been generated since the last checkpoint was taken. In this example, checkpoint 2 (CP 2) is selected for storing the new checkpoint. As the group tracking flags 94 for groups 0 and 3 are set, the checkpoint storage region 82-2 is written with the speculative register mappings for these register groups from the SRT 74, but the storage elements in subsets 300 corresponding to groups 1 and 2 as shown in FIG. 9 are not clocked and so they are not updated. The group tracking status flags 96 in the checkpoint state information 84 for checkpoint 2 are set so that flags G0 and G3 for the included groups are set to 1 and flags G1 and G2 for the omitted groups are set to 0. The youngest mask 92 is initialised to the initial value with the "1" bit at the least significant bit position and the valid bit 86 for checkpoint 2 is set to 1. The UID or reorder buffer pointer pointing to the entry corresponding to uop G is stored to field 88 of the checkpoint state information for checkpoint 2, to mark the restore point corresponding to the checkpoint. Also, the RCQ pointer 90 field of checkpoint 2 state information is set to a pointer value Px which marks the point of the RCQ 76 for the current moment of execution. Having captured checkpoint 2, all the flags 94 of the group tracking information 78 are cleared to zero to mark that all the logical register groups are unchanged groups whose register mappings have not changed since the last checkpoint was set.

Figure 10:
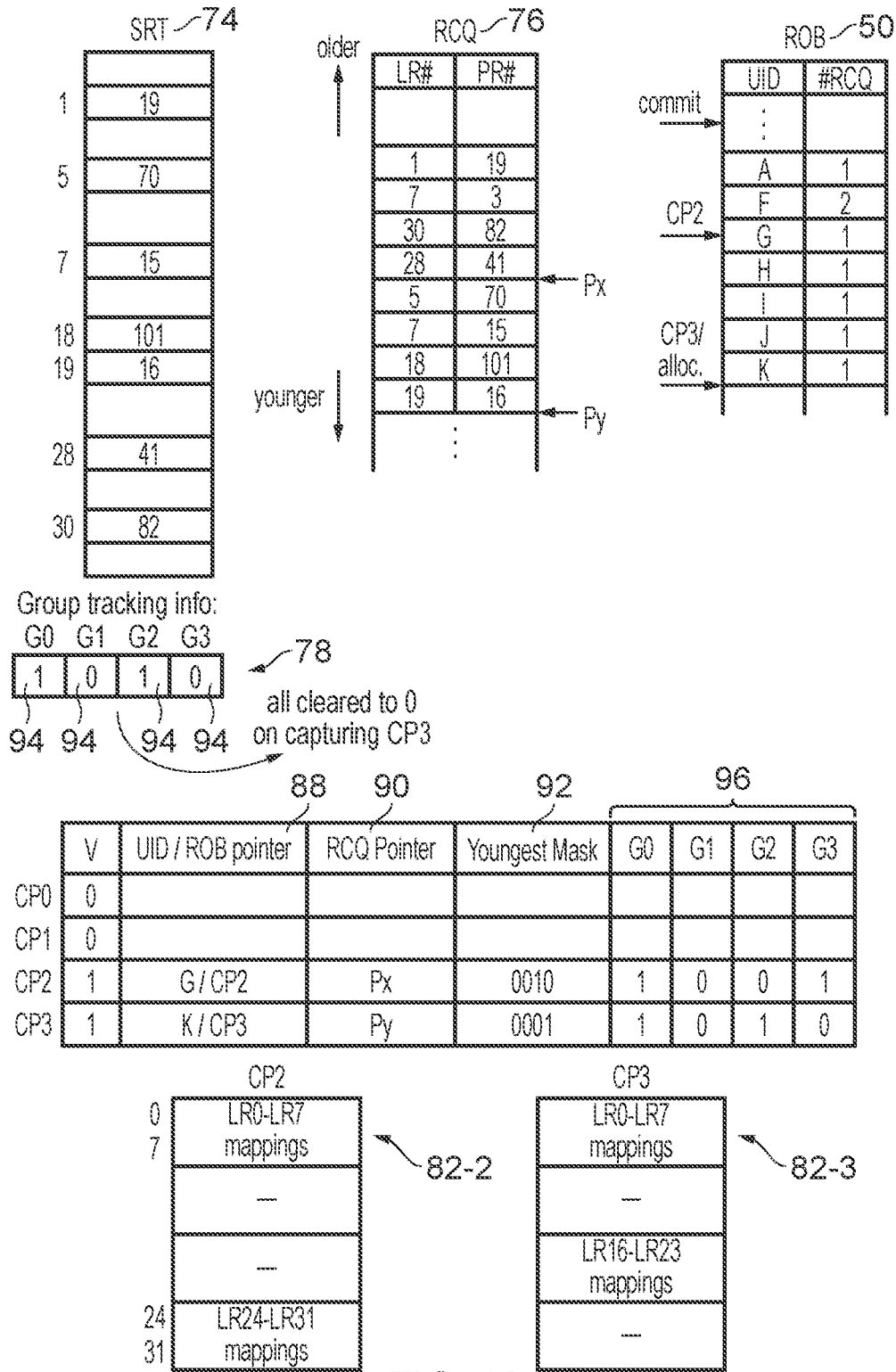

As shown in FIG. 10, following the not taken prediction for branch uop H in FIG. 2, program flow proceeds through uops H to K with new register mappings being generated for the logical destination register specified by each of these uops. Corresponding RCQ and ROB entries are allocated and the SRT entries for the specified logical registers are updated to specify their new mapped physical registers. Again, the group tracking information 78 is updated based on which logical registers had their mappings changed since the last checkpoint was taken and this time the updated logical registers are in groups 0 and 2 and groups 1 and 3 have remained unchanged since checkpoint 2 was taken.

As shown at the bottom of FIG. 10, when another checkpoint capture event occurs after renaming of uop K, another checkpoint is captured but this time as only the flags 94 for register groups 0 and 2 have been set, the newly captured checkpoints CP 3 includes the logical register mappings from the SRT 74 corresponding to registers 0 to 7 and 16 to 23 but the storage regions of 82-3 which correspond to groups 1 and 3 are not clocked so that these are not updated in the newly captured checkpoint. Again, the values of the group tracking flags 94 are copied to the corresponding flags 96 in the checkpoint state information for the newly captured checkpoint CP 3 and the fields 88, 90 are set to identify the points in the reorder buffer 50 and the RCQ 76 corresponding to the point of execution at which the checkpoint is taken. When the new checkpoint CP 3 is captured and its youngest mask field 92 is set to the initial value (the same as in FIG. 9), the youngest mask for any other checkpoints are updated by left shifting by one bit position, so as to indicate that checkpoint 2 is older than checkpoint 3. It will be appreciated that there are others ways of identifying the relative age and in other examples any operation, such as an increment or a right shift which can be used to identify the relative age could be applied to the other checkpoints mask fields 92 when a new checkpoint is stored.

Figure 11:
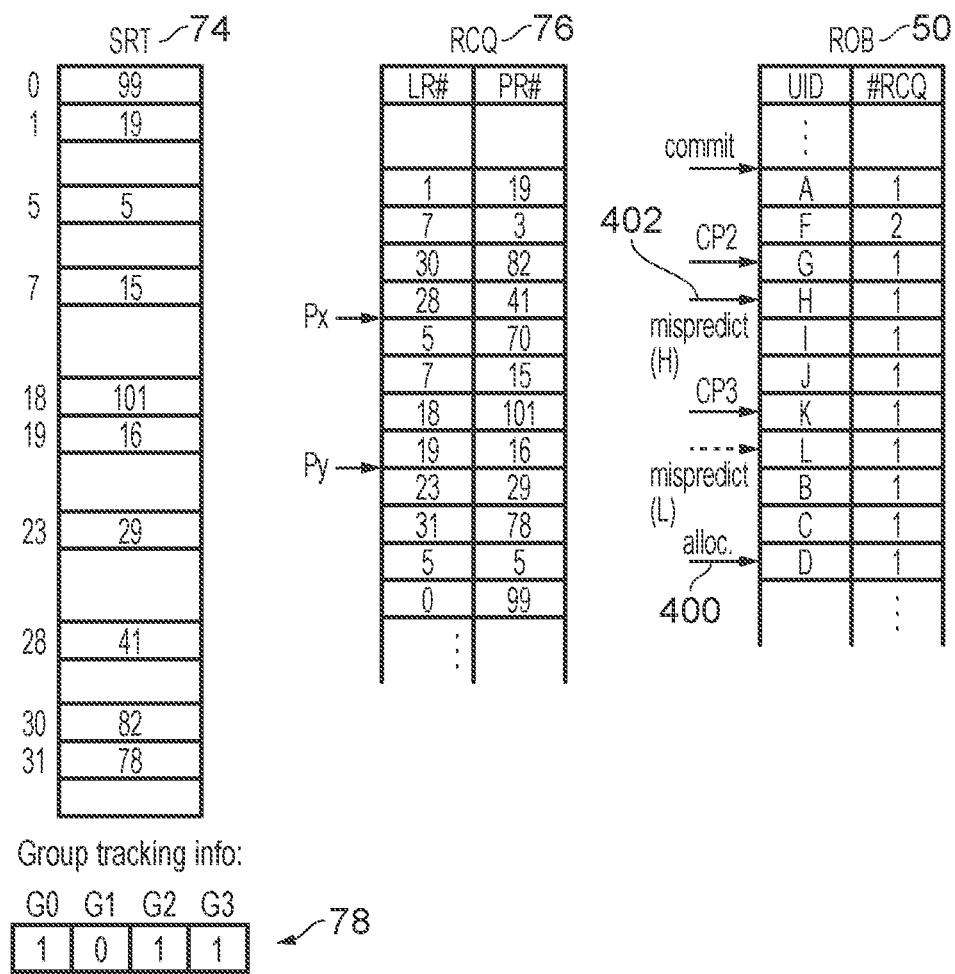

As shown in FIG. 11, after processing some further uops L, B, C, D, based on a taken prediction for the return branch uop L, it is determined that actually the prediction for branch uop H was incorrect and this branch should have been taken so that additional uops M to Q should have been executed. As these additional uops M to Q could have changed the values used as source operands for the executed uops I to L, this means that there could be incorrect results resulting from the mis-speculation for branch H and so program flow needs to be rewound to the mispredict point H and then continued from uop M according to the correct outcome of the branch. Also the speculative register mappings in the SRT 74 need to be restored to the state they were in when the branch H was encountered.

FIG. 11 shows the state of the SRT 74, RCQ 76 and ROB 50 and the group tracking information 78 at the time when misprediction is detected. By this point, the allocation pointer 400 in the ROB 50 has moved beyond the restore points CP 2, CP 3, at which checkpoints were taken. The mispredict point is identified with respect to the ROB by the arrow 402 which points to the entry associated with the branch H. This mispredict pointer 402 may be supplied by the branch unit 36 which detected the mispredicted branch for example.

Figure 12:
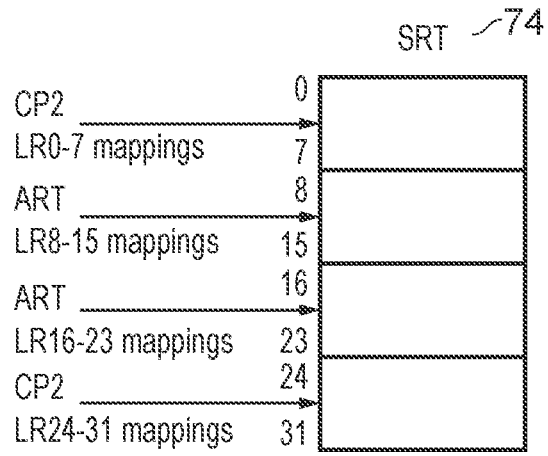
Figure 12:
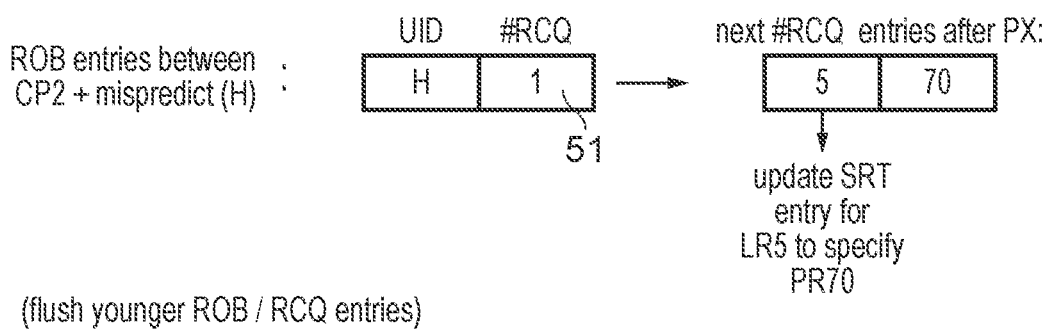
Figure 12:
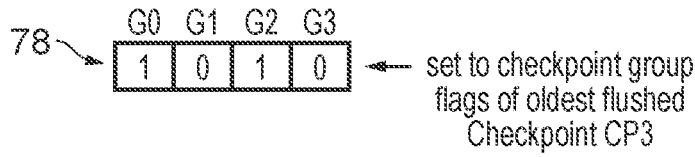

FIG. 12 shows the restoration of the speculative mappings in the SRT corresponding to the mispredict point at uop H. By comparing the UID or reorder buffer pointers 88 of the respective checkpoints CP 2 and CP 3 that are valid with the mispredict pointer 402, it can be determined that checkpoint CP 2 is older than the mispredict point and checkpoint CP 3 is younger than the mispredict point and so CP 3 cannot be used for restoration. In this case, there is only one older checkpoint CP 2 than the mispredict checkpoint and so for those logical register groups for which that checkpoint CP 2 includes speculative register mappings as indicated by the group status flags 96, the logical register mappings are copied from the checkpoint storage region 82-2 into the corresponding parts of the SRT for groups 0 and 3 as shown in FIG. 12. That is, the register mappings for logical registers 0 to 7 and 24 to 31 are copied from the corresponding parts of the checkpoint storage region 82-2. In this case there are no other valid checkpoints which contain register mappings for groups 1 and 2 and so for logical registers 8 to 15 and 16 to 23 the corresponding parts of the SRT 74 are restored based on the corresponding entries in the ART 72 as these registers have not had their mappings changed since the commit point. However, if there have been more than one older checkpoint than the mispredict point then for each logical register group the youngest of these older (pre-mispredict) checkpoints would have been selected, separately for each logical group, from among those valid pre-mispredict checkpoints which do include the register mappings for the corresponding group, to restore the corresponding part of the SRT.

Having restored the mappings from the checkpoint, then further updates to the SRT are made based on the reorder buffer and the RCQ. The UID or reorder buffer pointer 88 associated with the youngest pre-misprediction checkpoint CP 2 is used to select the entry of the reorder buffer 50 which follows the restore point, which in this example is the entry corresponding to uop H. In this example, this entry for uop H also represents the mispredict point and so only one reorder buffer entry needs to be read for this particular example, but in other examples there could be two or more reorder buffer entries between the restore point and the mispredict point and if so then each of those reorder buffers is read in turn. The checkpoint circuitry then reads the RCQ entry that is at the position marked by the RCQ pointer Px associated with the youngest pre-mispredict checkpoint and reads from that position the next #RCQ RCQ entries, where #RCQ is the count value 51 indicated by the first of the read ROB entries. Subsequently for each other read ROB entry, the next #RCQ entries after the previously read RCQ entries are read out. For each of the read RCQ entries, the corresponding register mapping is restored to the SRT. Hence, in this example there is only one reorder buffer entry read, which indicates that uop H generated a single RCQ entry. The corresponding RCQ entry read at pointer location Px mapped logical register 5 to physical register 70, which means that the entry of the SRT corresponding to logical register 5 is then updated to specify physical register 70. Of course, if there had been more new register mappings generated between the restore point and the mispredict point then more updates to the SRT will be performed.

Having restored the SRT to the point corresponding to the mispredict point, any younger reorder buffer or register commit queue entries that are younger than the mispredict point can be flushed and also any checkpoints which are younger than the mispredict point can be flushed. In this example checkpoint CP 3 was younger than the mispredict point. The group tracking information 78 is set to match the checkpoint group flags 96 of the oldest of any flushed post-mispredict checkpoints. Hence in this example the group tracking information 78 is set to match the values which were stored in the group status flags 96 for checkpoint 3. Processing can then resume with the correct path of processing following the mispredicted branch H, through uops M to Q as shown in FIG. 2.

Figure 13:
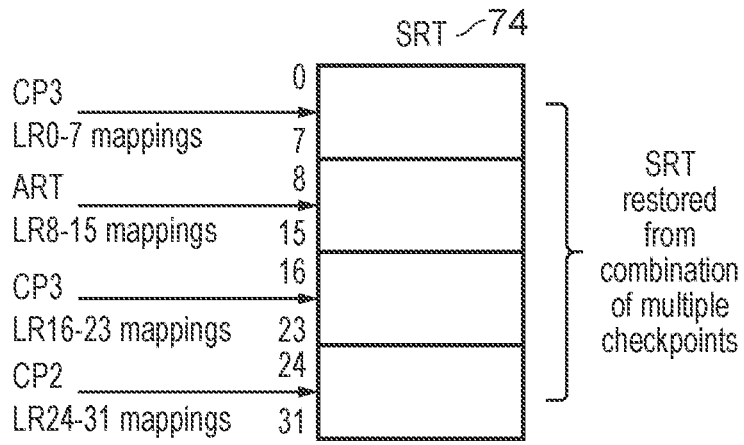
Figure 13:
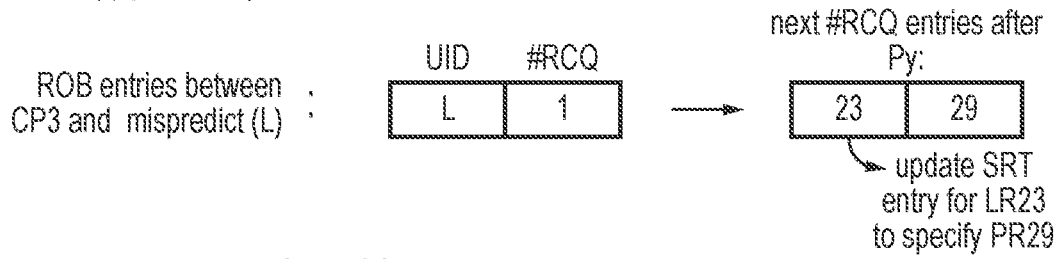
Figure 13:
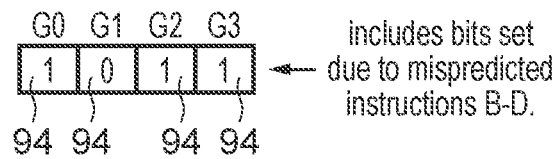

For the sake of explanation, FIG. 13 shows an alternative outcome which could have happened if the branch H had been correctly predicted not taken, but then return branch L was mispredicted and should have been not taken. In this case, there are two checkpoints CP 2, CP 3, which are older than the mispredict point corresponding to uop L. Hence, when sorting which checkpoint is the youngest pre-mispredict point which includes register mappings for each logical group, the checkpoint circuitry 28 will determine that CP 3 is the youngest pre-mispredict checkpoint for logical register groups 0 and 2, but as checkpoint 3 did not include any valid register mappings for groups 1 and 3, then CP 2 is the youngest pre-mispredict checkpoint which includes register mappings for group 3. As neither checkpoint CP 2 and CP 3 included any register mappings for group 1, there are no valid pre-misprediction checkpoints for group 1. Hence, as shown in FIG. 13 in this case the SRT 74 would be restored from a combination of mappings from checkpoint storage region 82-2, checkpoint storage region 82-3 and the ART 72, with logical register groups 0 and 2 coming from checkpoint CP 3, group 1 coming from the ART 72 and group 3 coming, from checkpoint CP 2. The youngest of the restored checkpoints is CP 3 and so its UID 88 and RCQ pointer 90 are used to identify the points in the reorder buffer 50 and RCQ 76 respectively which are used to apply any further updates to the SRT. In this example there is a single update based on the reorder buffer entry for uop L which indicates that there is a single RCQ entry to apply an updated register mapping for logical register 23. It will be appreciated that in practice more than one RCQ based update may be needed.

Unlike in FIG. 12, in this example of FIG. 13 there are no younger post-misprediction checkpoints, and so there is no need to flush any previously captured checkpoints and the group tracking information 78 retains its current state rather than being restored based on a flashed checkpoint. While the retained group tracking information 78 does include some tracking flags 94 which were set as a result of updates made by mispredicted uops B to D (the register mappings for groups 0 and 3 changed as a result of uops B to D but may not have changed for correctly executed instructions in the event that the return branch L was not taken), this is not a problem since even if none of the subsequently executed uops for the correct outcome of branch L actually change the register mappings in groups 0 or 3, this will merely lead to the next checkpoint capturing some additional state in its checkpoint storage 82 which might not have been needed, but execution results will still be correct because any incorrect changes to SRT 74 made in response to mispredicted uops B to D will have been reversed when SRT 74 was restored.

Hence, in summary, this approach enables power to be saved by capturing partial checkpoints and suppressing clocking of regions of the checkpoint storage which correspond to unchanged groups of logical registers for which the speculative mappings have not changed since the last checkpoint was taken, which can greatly save power.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
processing circuitry to perform data processing in response to micro-operations;
register renaming circuitry to map logical registers specified by the micro-operations to physical registers provided in hardware;
checkpoint circuitry to capture register mapping checkpoints, each register mapping checkpoint indicative of speculative register mappings between logical registers and physical registers at a given point of speculative execution; and
register group tracking circuitry to maintain tracking information for a plurality of groups of logical registers, each group comprising one or more logical registers, the tracking information for a given group indicating whether the given group is a changed group comprising at least one logical register for which a corresponding speculative register mapping has changed since a last register mapping checkpoint was captured, or an unchanged group for which none of the logical registers in that group have had their speculative register mappings changed since the last register mapping checkpoint was captured; in which:
when capturing a new register mapping checkpoint, the checkpoint circuitry is configured to exclude from the new register mapping checkpoint the speculative register mappings for logical registers in an unchanged group of logical registers; and
when capturing a new register mapping checkpoint, the checkpoint circuitry is configured to suppress clocking of a subset of checkpoint storage elements for storing checkpointed speculative register mappings for the unchanged group of logical registers.

2. The apparatus according to claim 1, in which each group comprises a plurality of logical registers.

3. The apparatus according to claim 1, in which when the checkpoint circuitry captures the new register mapping checkpoint, the register group tracking circuitry is configured to reset the tracking information to indicate that all groups of logical registers are unchanged groups of logical registers.

4. The apparatus according to claim 1, in which when capturing the new register mapping checkpoint, the checkpoint circuitry is configured to record checkpoint state information associated with the new register mapping checkpoint, the checkpoint state information indicative of which groups of logical registers have their speculative register mappings included in the new register mapping checkpoint.

5. The apparatus according to claim 1, comprising a speculative rename table to record current speculative register mappings between logical registers and physical registers; in which:
in response to a misprediction detected for a mispredict point of execution, the checkpoint circuitry is configured to restore, to the speculative rename table, speculative register mappings selected from at least one pre-misprediction register mapping checkpoint corresponding to an older point of execution than the mispredict point.

6. The apparatus according to claim 5, in which the checkpoint circuitry is capable of restoring, to the speculative rename table, speculative register mappings combined from a plurality of different register mapping checkpoints.

7. The apparatus according to claim 5, in which in response to the misprediction, the checkpoint circuitry is configured to determine, separately for each group of logical registers, which of the plurality of register mapping checkpoints is a youngest pre-misprediction register mapping checkpoint which includes speculative register mappings for that group of logical registers and corresponds to an older point of execution than the mispredict point; and
for each group of logical registers, the checkpoint circuitry is configured to restore, to the speculative rename table, the speculative register mappings specified for that group of logical registers by the youngest pre-misprediction register mapping checkpoint determined for that group of logical registers.

8. The apparatus according to claim 5, comprising a register commit queue to record a sequence of updates to speculative register mappings; in which:
following restoration of speculative register mappings to the speculative rename table based on speculative register mappings corresponding to a restore point of execution earlier than the mispredict point of execution, the checkpoint circuitry is configured to apply further updates to the speculative rename table based on one or more speculative register mappings recorded in the register commit queue which correspond to points of execution between the restore point of execution and the mispredict point of execution.

9. The apparatus according to claim 1, in which in response to a misprediction detected for a mispredict point of execution, the checkpoint circuitry is configured to flush a post-misprediction register mapping checkpoint corresponding to a younger point of execution than the mispredict point of execution.

10. The apparatus according to claim 9, in which each register mapping checkpoint is associated with checkpoint state information indicative of which groups of logical registers have their speculative register mappings included in that register mapping checkpoint; and
when at least one register mapping checkpoint is flushed in response to the misprediction, the register group tracking circuitry is configured to update the tracking information based on the checkpoint state information associated with an oldest post-misprediction register mapping checkpoint.

11. The apparatus according to claim 10, in which the register group tracking circuitry is configured to update the tracking information to indicate as the changed group of logical registers a group of logical registers indicated by the checkpoint state information as being included in said oldest post-misprediction register mapping checkpoint, and to indicate as the unchanged group of logical registers a group of logical registers indicated by the checkpoint state information as being excluded from said oldest post-misprediction register mapping checkpoint.

12. The apparatus according to claim 9, in which in response to the misprediction when no register mapping checkpoints have been captured since the mispredict point of execution, the register group tracking circuitry is configured to retain a current value of the tracking information, so that when execution resumes after handling of the misprediction, the tracking information is the same as the tracking information which was updated based on a mispredicted flow of execution prior to the misprediction being detected.

13. The apparatus according to claim 1, in which in response to a micro-operation specifying a destination logical register, the register group tracking circuitry is configured to set the tracking information to indicate that a group of logical registers including the destination logical register is said changed group of logical registers.

14. An apparatus comprising:
processing circuitry to perform data processing in response to micro-operations;
register renaming circuitry to map logical registers specified by the micro-operations to physical registers provided in hardware;
checkpoint circuitry to capture register mapping checkpoints, each register mapping checkpoint indicative of speculative register mappings between logical registers and physical registers at a given point of speculative execution;
register group tracking circuitry to maintain tracking information for a plurality of groups of logical registers, each group comprising one or more logical registers, the tracking information for a given group indicating whether the given group is a changed group comprising at least one logical register for which a corresponding speculative register mapping has changed since a last register mapping checkpoint was captured, or an unchanged group for which none of the logical registers in that group have had their speculative register mappings changed since the last register mapping checkpoint was captured;
a speculative rename table to record current speculative register mappings between logical registers and physical registers; and
an architectural rename table to record non-speculative register mappings between logical registers and physical registers corresponding to a commit point of execution; in which:
when capturing a new register mapping checkpoint, the checkpoint circuitry is configured to exclude from the new register mapping checkpoint the speculative register mappings for logical registers in an unchanged group of logical registers;
in response to a misprediction detected for a mispredict point of execution, the checkpoint circuitry is configured to restore, to the speculative rename table, speculative register mappings selected from at least one pre-misprediction register mapping checkpoint corresponding to an older point of execution than the mispredict point; and
when, for a given group of logical registers, the checkpoint circuitry identifies that none of the captured register mapping checkpoints which correspond to an older point of execution than the mispredict point includes speculative register mappings for the given group of logical registers, the checkpoint circuitry is configured to restore to the speculative rename table the non-speculative register mappings specified by the architectural rename table for said given group of logical registers.

15. A data processing method comprising:
performing data processing in response to micro-operations;
mapping logical registers specified by the micro-operations to physical registers provided in hardware;
capturing register mapping checkpoints, each register mapping checkpoint indicative of speculative register mappings between logical registers and physical registers at a given point of speculative execution; and
maintaining tracking information for a plurality of groups of logical registers, each group comprising one or more logical registers, the tracking information for a given group indicating whether the given group is a changed group comprising at least one logical register for which a corresponding speculative register mapping has changed since a last register mapping checkpoint was captured, or an unchanged group for which none of the logical registers in that group have had their speculative register mappings changed since the last register mapping checkpoint was captured; in which:
when a new register mapping checkpoint is captured, speculative register mappings for logical registers in an unchanged group of logical registers are excluded from the new register mapping checkpoint; and the method comprises:
when capturing a new register mapping checkpoint, suppressing clocking of a subset of checkpoint storage elements for storing checkpointed speculative register mappings for the unchanged group of logical registers.

* * * * *